US008824433B2

(12) United States Patent
Chen et al.

(10) Patent No.: US 8,824,433 B2
(45) Date of Patent: Sep. 2, 2014

(54) DATA OFFLOADING WITH DISTRIBUTED IP MANAGEMENT AND ROUTING

(75) Inventors: Xuming Chen, San Ramon, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 383 days.

(21) Appl. No.: 12/842,310

(22) Filed: Jul. 23, 2010

(65) Prior Publication Data

US 2012/0020260 A1    Jan. 26, 2012

(51) Int. Cl.
*H04W 4/00*    (2009.01)

(52) U.S. Cl.
USPC ........... 370/338; 370/331; 370/351; 370/227; 370/228; 455/405; 455/445

(58) Field of Classification Search
USPC ......... 370/331, 351–356, 252, 223, 227, 228; 455/405, 445
See application file for complete search history.

(56) References Cited

U.S. PATENT DOCUMENTS

| | | | | |
|---|---|---|---|---|
| 7,280,546 | B1* | 10/2007 | Sharma et al. | 370/401 |
| 8,432,871 | B1* | 4/2013 | Sarnaik et al. | 370/331 |
| 2008/0254833 | A1* | 10/2008 | Keevill et al. | 455/558 |
| 2011/0075557 | A1* | 3/2011 | Chowdhury et al. | 370/230 |

* cited by examiner

*Primary Examiner* — Kibrom T Hailu
*Assistant Examiner* — Zewdu A Beyen

(57) ABSTRACT

A method performed by a wireless node includes receiving policies for data offloading; identifying a user associated with a data flow to which a user device is attached; determining whether data offloading is permitted for the user based on the policies; and performing data offloading when it is determined that data offloading is permitted for the user, wherein data offloading includes routing the data flow away from at least one of a higher layer traffic aggregation device relative to the wireless node or a higher hierarchical controlling device relative to the wireless node.

23 Claims, 27 Drawing Sheets

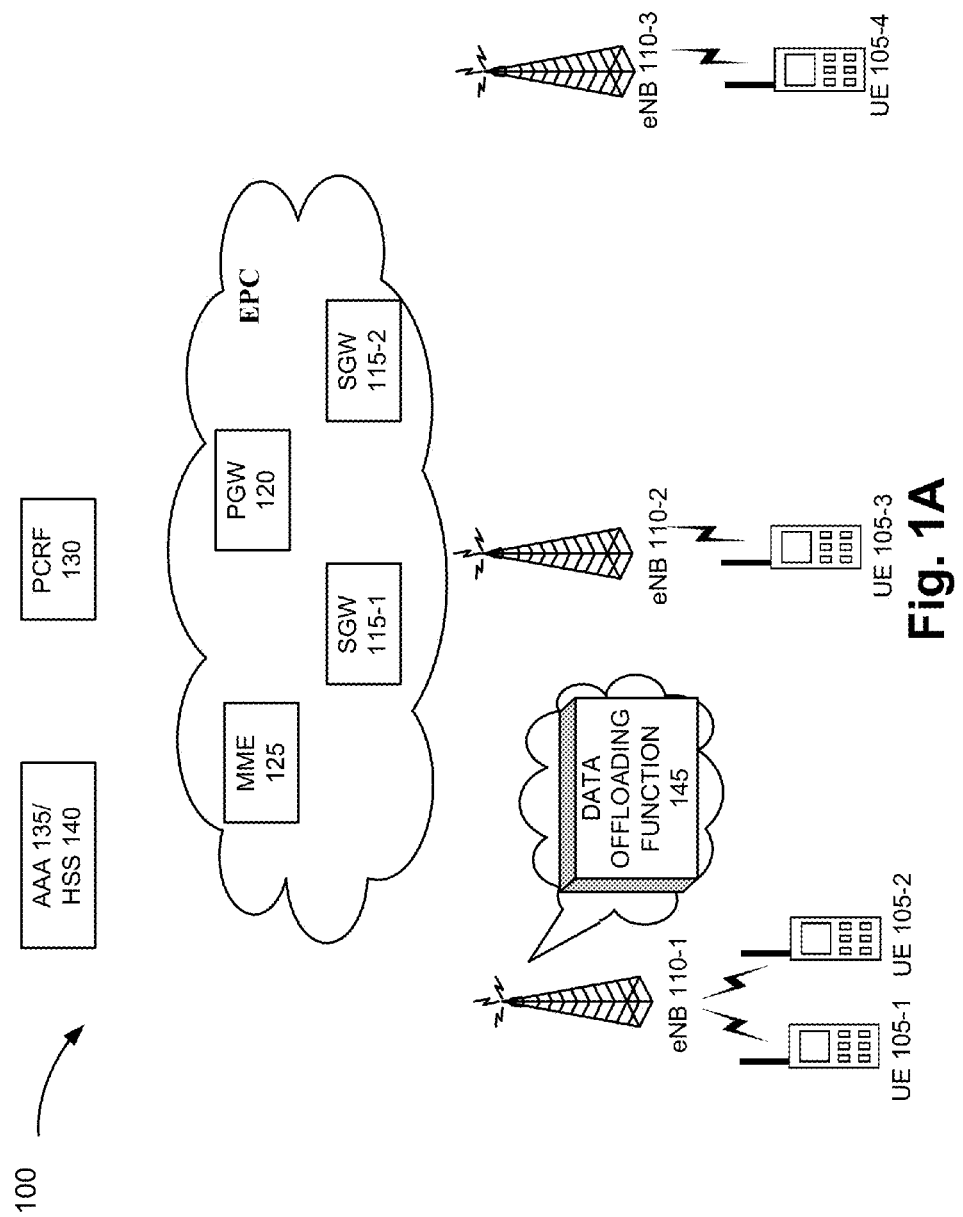

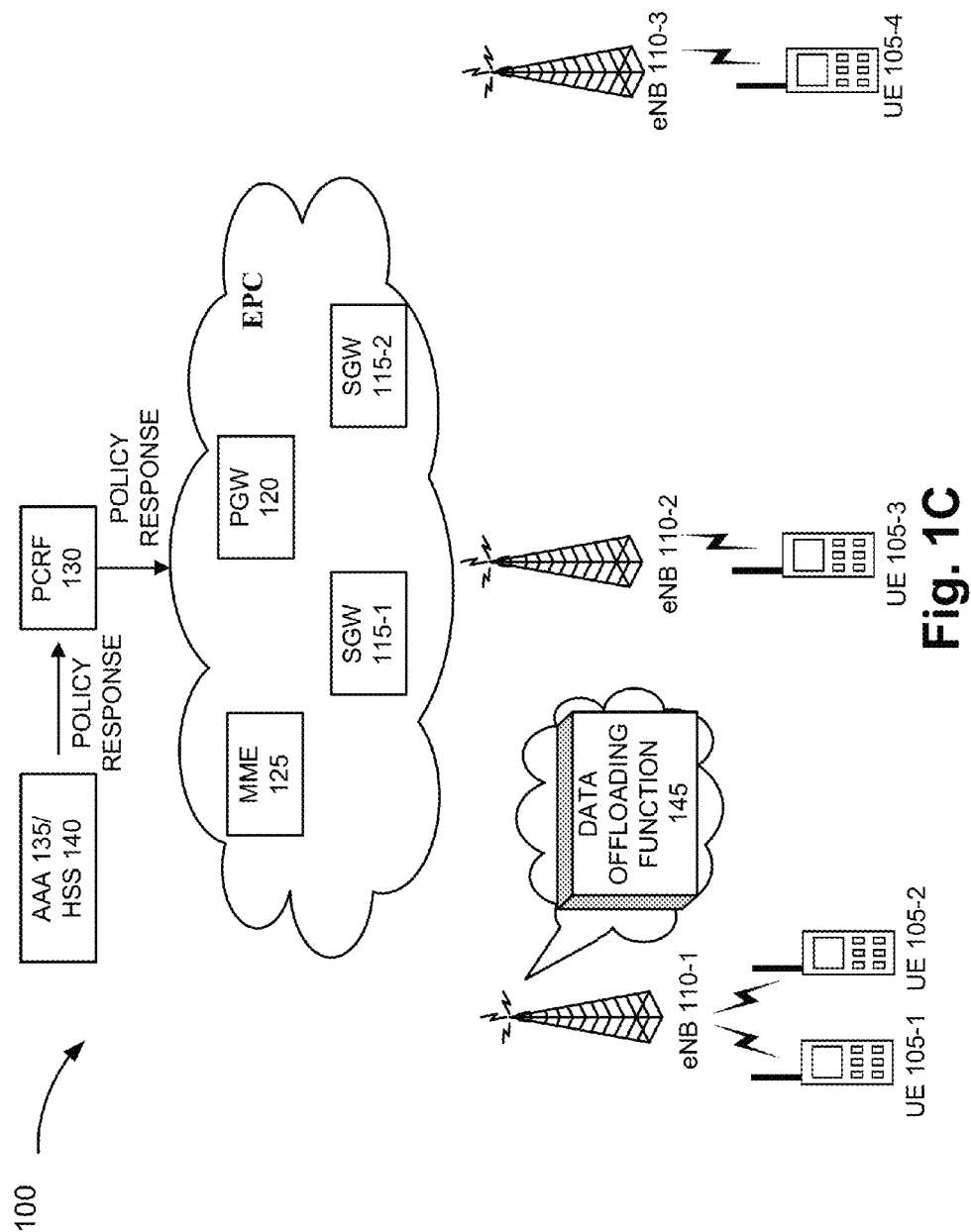

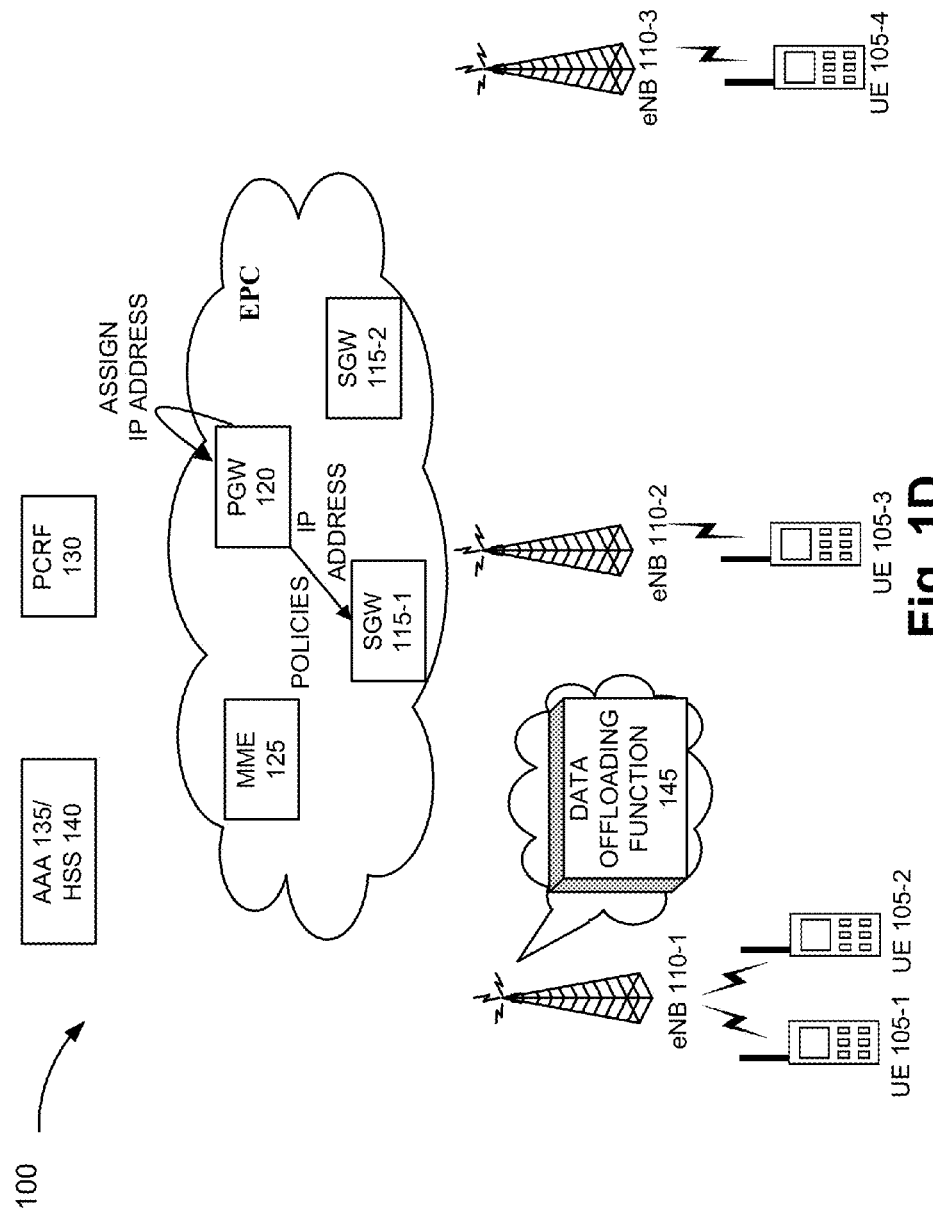

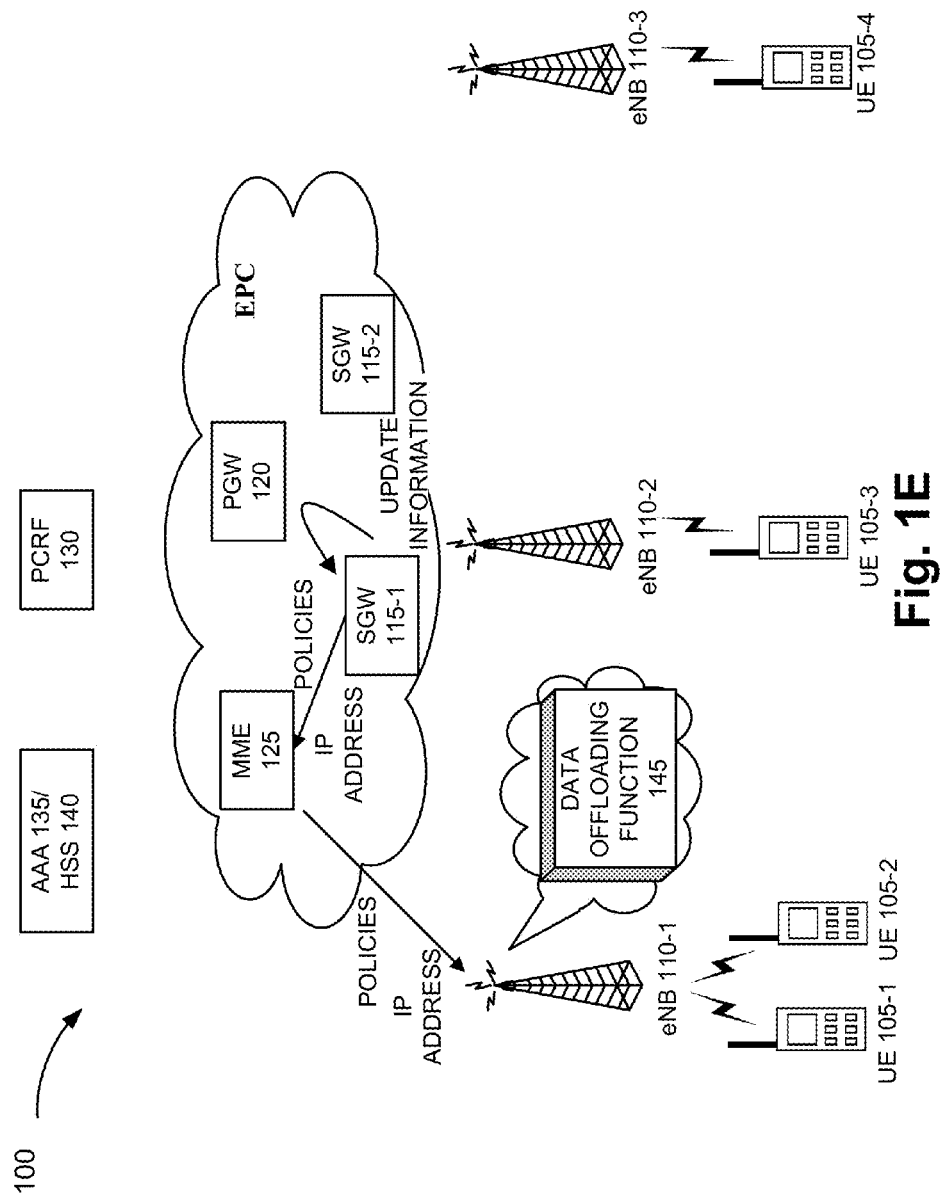

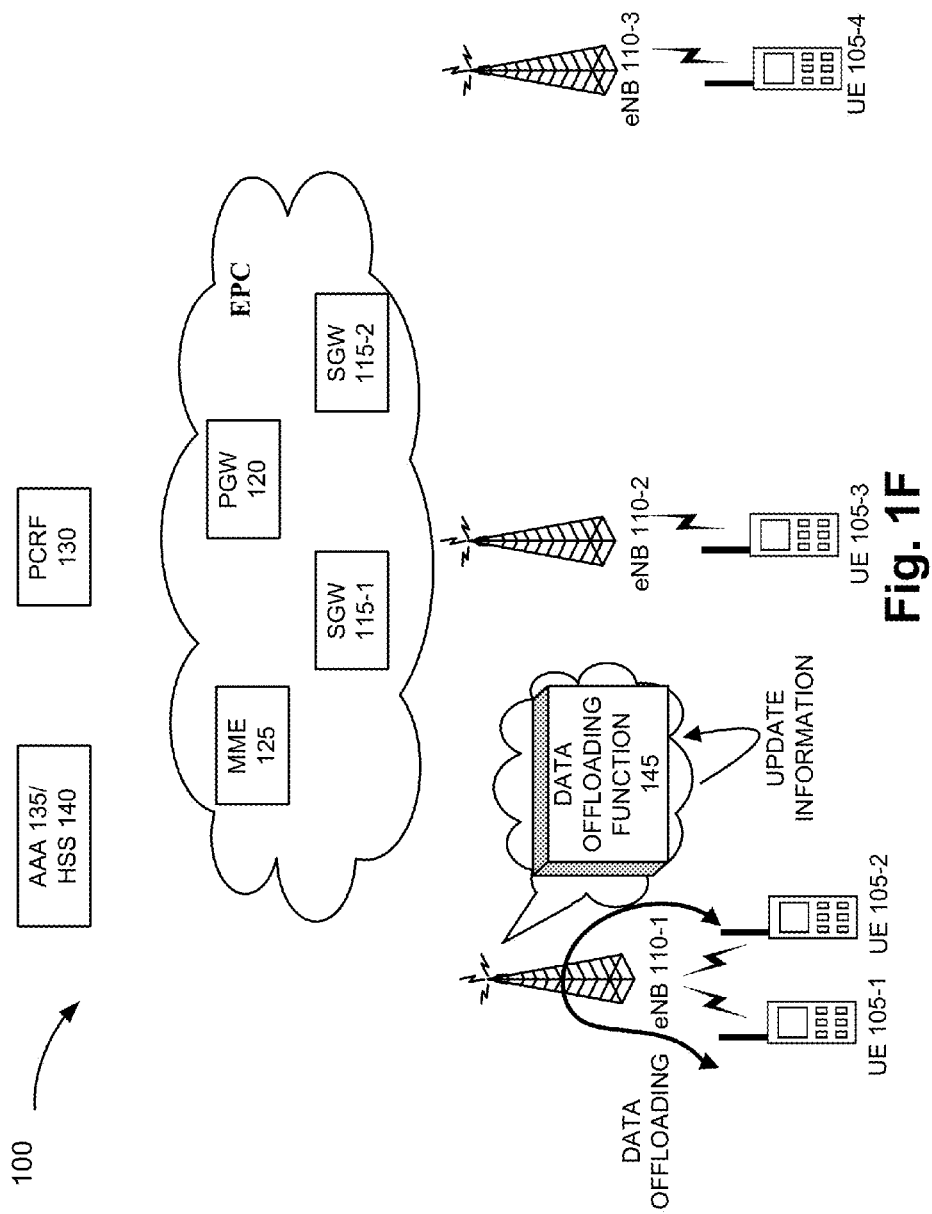

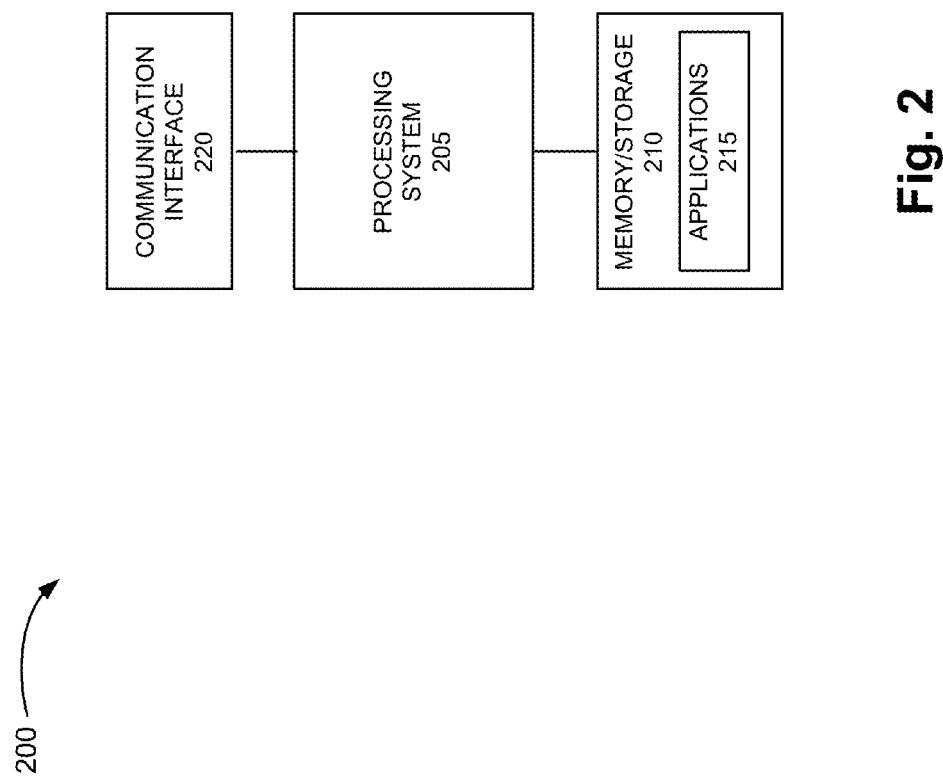

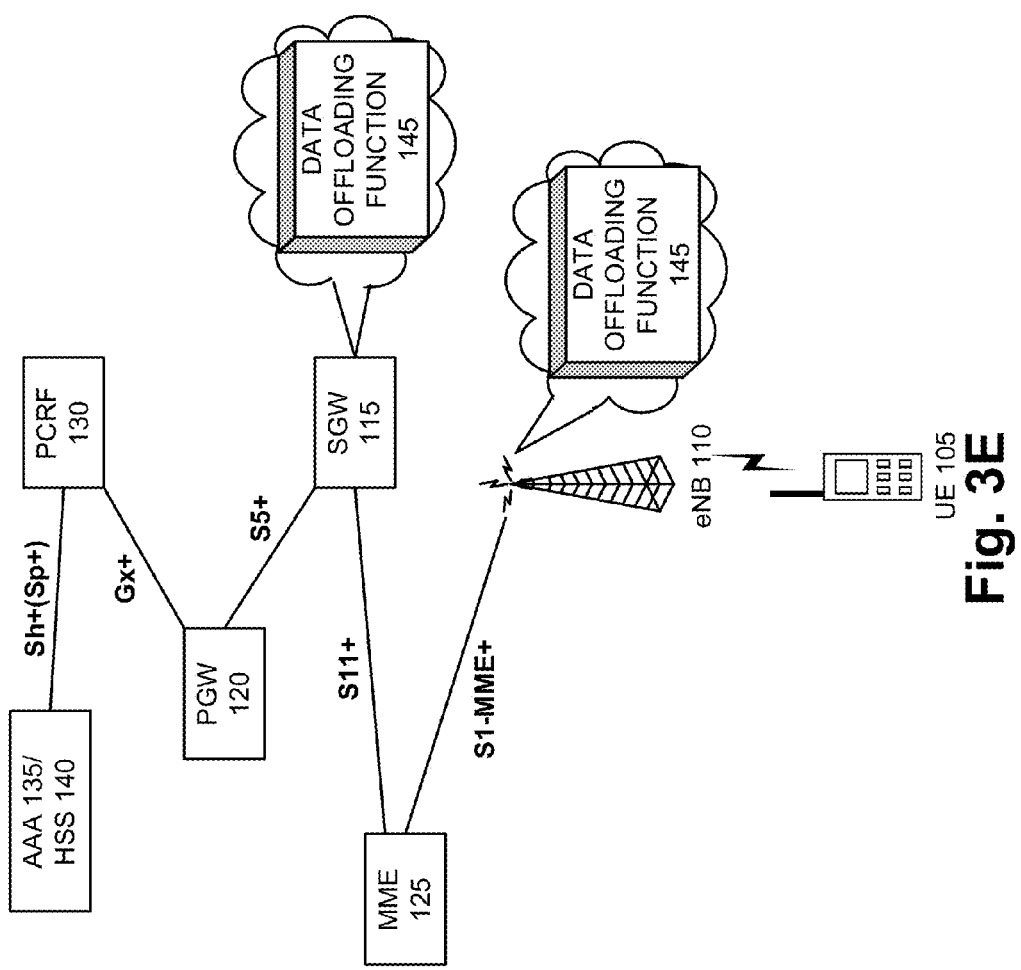

DATA OFFLOADING WITH DISTRIBUTED IP MANAGEMENT AND ROUTING

BACKGROUND

As network operators and service providers strive to provide new or improved services and/or assets to users, network demands may correspondingly increase. As a result, network operators and service providers must confront a host of challenges to ensure that quality of service (QOS) and other performance metrics are maintained.

BRIEF DESCRIPTION OF THE DRAWINGS

FIG. 1A is a diagram illustrating an exemplary network in which data offloading with distributed Internet Protocol (IP) management and routing may be implemented;

FIGS. 1B-1F are diagrams illustrating an exemplary process in which data offloading may be implemented;

FIG. 2 is a diagram illustrating exemplary components of a device that may correspond to one or more of the devices in the exemplary network;

FIG. 3E is a diagram illustrating exemplary modified interfaces for devices in the network;

DETAILED DESCRIPTION OF PREFERRED EMBODIMENTS

Figure 1B:
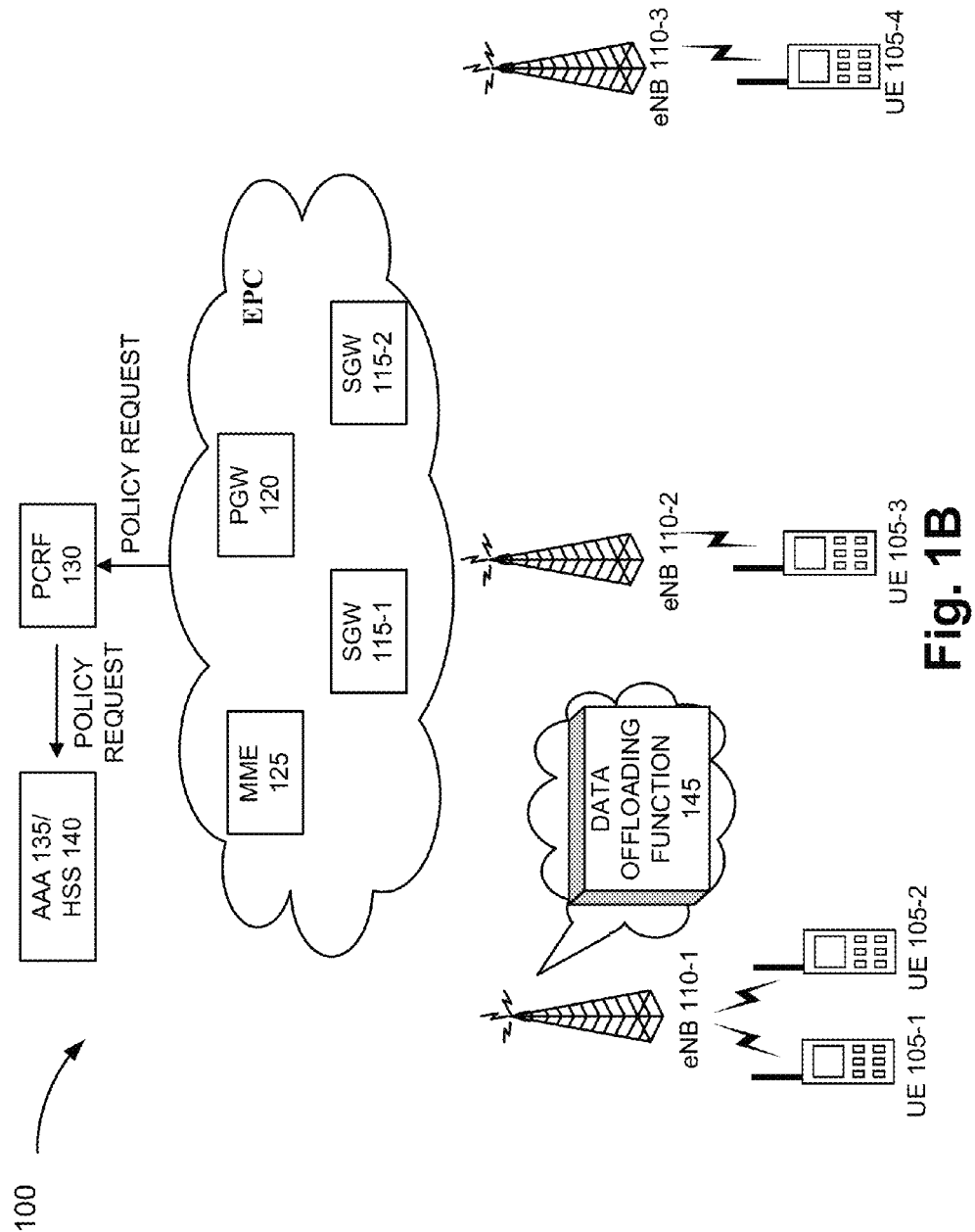

The following detailed description refers to the accompanying drawings. The same reference numbers in different drawings may identify the same or similar elements. Also, the following detailed description does not limit the invention.

The term "wireless node," is intended to be broadly interpreted to include a device that wirelessly communicates with a user device (e.g., user equipment (UE)). By way of example, a wireless node may correspond to an evolved Node B (eNB), a base station (BS), a base station controller (BSC), a Node B, a base transceiver station (BTS), a relay node, a repeater, a home eNB (HeNB), a home node B (HNB), a radio node, or a UE-gateway (UE-GW). The wireless node may support one access and/or wireless technology or multiple access and/or wireless technologies.

The term "data offloading," as used herein, is to be broadly interpreted to include providing user device-to-user device data flow (e.g., not including signaling flow) between users as locally as possible toward the users. Examples of "data offloading" are further described in co-pending patent application Ser. Nos. 12/692,232 and 12/695,208, which are incorporated by reference herein in their entirety. Data offloading may be applied to a variety of data flows (e.g., peer-to-peer applications, mobile-to-mobile flows, etc.). Additionally, data offloading may be applied per user per application or per data flow per user. Data offloading may be applied within a same operator network or between different operator networks.

By way of example, within a Long Term Evolution (LTE) network, data offloading may permit a data flow to traverse one or more wireless nodes (e.g., one or more eNBs) to which user devices may be attached without traversing higher layers of the LTE network (e.g., a serving gateway (SGW), a packet data network (PDN) gateway (PGW)). However, data offloading may be applicable to networks other than the LTE network. In this regard, the term "network," as used herein, is intended to be broadly interpreted to include a wireless network (e.g., mobile network, cellular network, non-cellular network, etc.). For example, data offloading may be performed in a variety of network types, such as, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a Evolution Data Optimized (EV-DO) network, and/or another type of wireless network (e.g., an ad hoc network, etc.), or some other type of wired network.

According to exemplary embodiments, a wireless node may determine whether data offloading is permitted based on global data offloading policies and other information stored by the wireless node. For example, the global data offloading policies may be defined against access point names (APNs) and data flows using the APNs. According to such an implementation, the wireless node may determine whether data offloading is permitted when an APN is included with the global data offloading policies. The wireless node may also use other information (e.g., a peer table and a neighbor table) to permit the wireless node to make decisions relating to data offloading. For example, the peer table may store information associated with data flows in which data offloading is permitted. For example, peer table may include IP addresses and/or identifiers (e.g., International Mobile Subscriber Identity (IMSI), etc.) that may be mapped to APNs. According to an exemplary implementation, data flows that are not defined in the peer table may be forwarded to an upper layer. For example, within an LTE environment, if a peer table stored by an eNB does not include a particular data flow, the eNB may forward the data flow to a higher layer (e.g., an SGW or a PGW). Also, for example, the neighbor table may store neighbor information associated with the wireless node. The wireless node may use the neighbor table to permit data offloading between the wireless node and a neighbor wireless node.

Given this framework, a wireless node that provides data offloading may include a data offloading function (DOF). For example, as a consequence of data offloading, modifications to the LTE standard or modifications to another communication standard associated with the wireless node may be needed to address when data offloading is performed at the wireless node. That is, typically, for example, user device-to-user device flows traverse higher layers of the LTE network (e.g., at the PGW, etc.) where policy enforcement and the managing of connections, flows, etc., may occur. However, according to an exemplary embodiment, and in contrast to the LTE standard, the wireless node may be responsible for policy enforcement, the managing of connections, flows, etc., in correspondence to data offloading.

Additionally, as will be described further below, according to an exemplary embodiment, modifications to existing interfaces between devices, new interfaces between devices, new messaging, modified messaging, etc., may be implemented to permit the wireless node to provide data offloading.

FIG. 1A is a diagram illustrating an exemplary network 100 in which data offloading with distributed IP management and routing may be implemented. As illustrated in FIG. 1A, exemplary network 100 may include eNBs 110-1 through 110-3 (referred to generally as eNB 110 or eNBs 110), SGWs 115-1 through 115-2 (referred to generally as SGW 115 or SGWs 115), PGW 120, mobility management entity (MME) 125, policy and charging rules function (PCRF) device 130, and an authentication, authorization, and accounting (AAA) server 135/home subscriber server (HSS) 140 (AAA 135/HSS 140) According to an exemplary implementation of the LTE communication standard, SGW 115, PGW 120, and MME 125 may form an Evolved Packet Core (EPC) network. UEs 105-1 through 105-4 (referred to generally as UE 105 or UEs 105) may attach to network 100 for services, assets, etc.

The number of devices and configuration in network 100 is exemplary and provided for simplicity. In practice, network 100 may include more devices, fewer devices, different devices, and/or differently arranged devices than those illustrated in FIG. 1A. For example, network 100 may include another type of gateway, a relay node, a (HeNB), a femtocell, a picocell, a repeater, a radio node, a UE-GW, etc. Additionally, or alternatively, network 100 may include additional networks and/or different networks than those illustrated in FIG. 1A. For example, network 100 may include public and/or private IP networks and/or other types of networks, resources, assets, services, Application Service Providers (ASPs), other operators that may host applications, etc. Also, some functions described as being performed by a particular device (e.g., a wireless node, etc.) may be performed by a different device or a combination of devices. Additionally, or alternatively, although FIG. 1A illustrates separate instances of MME 125, PGW 120, SGW 115, etc., according to other implementations, two or more of these devices may be combined. For example, MME 125 may be combined with SGW 115, or PGW 120 may be combined with SGW 115, PCRF 130 may be combined with PGW 120, etc. Network 100 may include wired and/or wireless connections among the devices illustrated. UE 105 may include a device having the capability to communicate with other devices, systems, networks, and/or the like. For example, UE 105 may include a wireless telephone, an IP telephone, a computer (e.g., a laptop, a palmtop, etc.), a personal digital assistant (PDA), a gaming device, a personal communication system (PCS) terminal, a pervasive computing device, a video playing device, a music playing device, a kiosk, and/or some other type of portable device, mobile device, handheld device, stationary device, user device, and/or vehicle-based device. According to an exemplary implementation, UE 105 may operate according to one or more versions of the LTE communication standard. According to other implementations, UE 105 may operate according to one or more other wireless and/or wired network standards.

ENB 110 may include a network device that operates according to one or more versions of the LTE communication standard. Additionally, according to other exemplary implementations, eNB 110 may operate according to access technologies (e.g., radio access technologies, etc.) other than an LTE communication standard. ENB 110 may include a data offloading function (DOF) 145. As described further below, DOF 145 may enforce data offloading policies in relation to data offloading. Additionally, as described further below, eNB 110 may include new and/or modified interfaces to communicate with other devices in relation to data offloading. Additionally, eNB 110 may use new and/or modified messaging to communicate with other devices in relation to data offloading.

SGW 115 may include a network device that operates according to one or more versions of the LTE communication standard. Additionally, according to other exemplary implementations, SGW 115 may operate according to a communication standard other than an LTE communication standard. Since data offloading may be performed at SGW 115, although not illustrated, SGW 115 may include DOF 145. Additionally, as described further below, according to an exemplary embodiment, SGW 115 may include new and/or modified interfaces to communicate with other devices in relation to data offloading. Additionally, SGW 115 may use new and/or modified messaging to communicate with other devices in relation to data offloading.

PGW 120 and MME 125 may include network devices that operate according to one or more versions of the LTE communication standard. Additionally, according to other exemplary implementations, PGW 120 and MME 125 may operate according to a communication standard other than an LTE communication standard. Also, as described further below, PGW 120 and MME 125 may include new and/or modified interfaces to communicate with the devices in relation to data offloading. Additionally, PGW 120 and MME 125 may use new and/or modified messaging to communicate with other devices in relation to data offloading.

PCRF device 130 may include a network device that manages bandwidth, charging rates, and policies. AAA server 135 may include a network device that provides authentication, authorization, and accounting services. HSS 140 may include a network device that provides subscriber data storage for subscription-related information (e.g., subscriber profiles, etc.). HSS 140 may also provide other services (e.g., authentication, authorization, etc.). According to an exemplary embodiment, AAA 135/HSS 140 may store application/service policies, data offloading policies, etc. According to an exemplary embodiment, PCRF device 130 and AAA 135/HSS 140 may use new and/or modified messaging to communicate with other devices in relation to data offloading.

FIGS. 1B-1F are diagrams illustrating an exemplary process in which data offloading may be implemented. In this example, the wireless node that performs data offloading corresponds to eNB 110-1. According to other implementations, the wireless node may be a different device.

Referring to FIG. 1B, according to the exemplary process, it may be assumed that UEs 105-1 and 105-2 attached to network 100 using a normal call flow for an LTE network. According to an exemplary embodiment, PGW 120 may send a policy request to PCRF 130. PCRF 130 may request policies that include, among other policies, data offloading policies from AAA 135/HSS 140. AAA 135/HSS 140 may provide a policy response that is received by PGW 120, as illustrated in FIG. 1C.

Referring to FIG. 1D, PGW 120 may assign IP addresses to UE 105-1 and UE 105-2. PGW 120 may pass the IP assignment and policies to SGW 115-1. As illustrated in FIG. 1E, DOF 145 of SGW 115-1 (not illustrated) may update information (e.g., global data offloading policies or a peer table). SGW 115-1 may pass the IP assignment and policies to eNB 110-1 via MME 125. In turn, DOF 145 of eNB 110-1 may update information, as illustrated in FIG. 1F. UE 105-1 and 105-2 may each receive an IP address and DOF 145 of eNB 110-1 may determine that data offloading is permitted based on the global data offloading policies or the global data offloading policies or the peer table.

Since an exemplary embodiment has been broadly described, a more detailed description is provided below.

FIG. 2 is a diagram illustrating exemplary components of a device 200 that may correspond to one or more of the devices in network 100. For example, device 200 may correspond to PGW 120, SGW 115, eNB 110, as well as other devices (e.g., MME 125, UE 105, etc.), depicted in FIGS. 1A-1F. As illustrated, device 200 may include a processing system 205, memory/storage 210 including applications 215, and a communication interface 220. According to other implementations, device 200 may include fewer components, additional components, different components, and/or a different arrangement of components than those illustrated in FIG. 2 and described herein.

Processing system 205 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation or a portion of operation(s) performable by device 200. Processing system 205 may perform one or more operations based on an operating system and/or various applications (e.g., applications 215).

Memory/storage 210 may include one or more memories and/or one or more secondary storages. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory, a storage device, or storage component that is external to and/or removable from device 200, such as, for example, a Universal Serial Bus (USB) memory stick, a hard disk, mass storage, off-line storage, etc.

The term "computer-readable medium," as used herein, is intended to be broadly interpreted to include, for example, a memory, a secondary storage, a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Applications 215 may include software that provides various services or functions. For example, applications 215 may include one or more applications for performing data offloading.

Communication interface 220 may permit device 200 to communicate with other devices, networks, systems and/or the like. Communication interface 220 may include a wireless interface and/or wired interface. Communication interface 220 may include a transmitter, a receiver, and/or a transceiver. Communication interface 220 may include interfaces according to LTE communication standards. For example, as described further below, communication interface 220 may include new interfaces and/or modified interfaces with respect to the LTE standard. Alternatively, communication interface 220 may include new interfaces and/or modified interfaces with respect to communication standards other than LTE.

Device 200 may perform operations in response to processing system 205 executing software instructions contained in a computer-readable medium, such as memory/storage 210. For example, the software instructions may be read into memory/storage 210 from another computer-readable medium or from another device via communication interface 220. The software instructions contained in memory/storage 210 may cause processing system 205 to perform processes described herein. Alternatively, device 200 may perform processes based on hardware, hardware and firmware, or hardware, software and firmware.

Figure 3A:
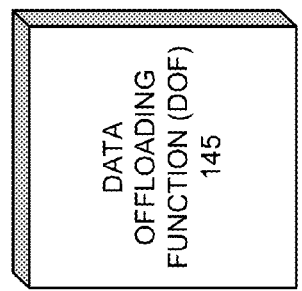
FIG. 3A is a diagram illustrating an exemplary functional component associated with an exemplary implementation of a wireless node.

As previously described, a wireless node may perform data offloading. FIG. 3A is a diagram illustrating an exemplary functional component associated with an exemplary implementation of a wireless node. As illustrated, the wireless node may include DOF 145. DOF 145 may be implemented as a combination of hardware (e.g., processing system 205, etc.) and software (e.g. applications 215, etc.) based on the components described with respect to FIG. 2. Alternatively, DOF 145 may be implemented as hardware and firmware, or hardware, software and firmware.

DOF 145 may determine whether data offloading is performed based on policies and/or information associated with the network, subscribers, type of application, type of data flow, etc. For example, if a user is a target under the Communications Assistance for Law Enforcement Act (CALEA), DOF 145 may determine that data offloading may not be performed. According to another example, if a user has subscribed to content filtering, then a data flow may be directed to a device that manages content filtering and DOF 145 may determine that data offloading may not be performed. According to yet another example, if a data flow is not a peer-to-peer flow (e.g., a server-based application, etc.) or the user is a roaming subscriber, DOF 145 may determine that data offloading may not be performed. Conversely, for example, DOF 145 may determine data offloading may be performed when the data flow corresponds to a peer-to-peer flow or another type of flow that is suitable for data offloading, the user has a subscription for data offloading, other information and/or policies related to data offloading, etc.

DOF 145 may reside in various types of wireless nodes. According to an exemplary implementation, DOF 145 may determine whether data offloading should be performed based on global data offloading policies and other types of information. An exemplary global data offloading table, an exemplary peer table, and an exemplary neighbor table is described below in which DOF 145 may use to determine whether data offloading is permitted. DOF 145 may also use the information included in the global data offloading table, the peer table, and/or the neighbor table to perform data offloading once it is determined that data offloading is to be performed.

Although FIG. 3A illustrates an exemplary functional component of the wireless node, according to other implementations, the wireless node may include additional functional components, different functional components, and/or a different arrangement of functional components than those illustrated in FIG. 3A and described.

Figure 3B:
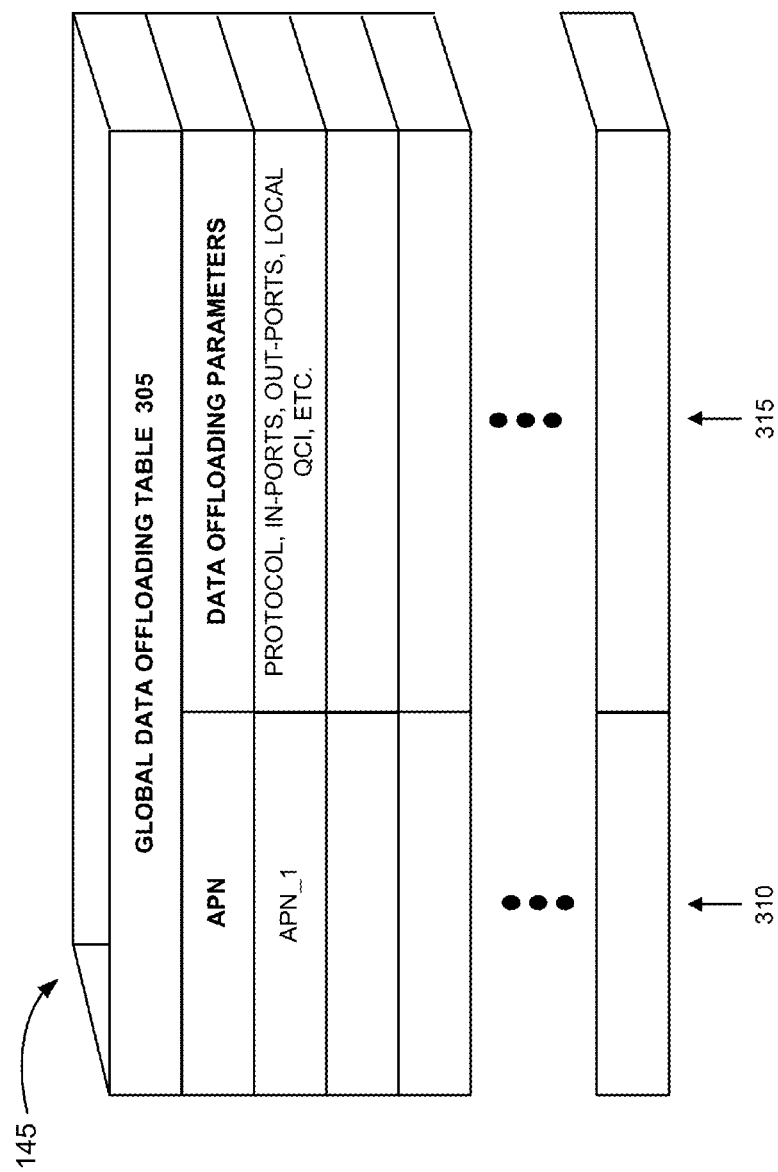
FIG. 3B is a diagram illustrating an exemplary global data offloading table.

As previously described, the wireless node may use global data offloading policies. For example, the wireless node may determine whether data offloading is permitted based on the global data offloading policies. FIG. 3B is a diagram illustrating an exemplary global data offloading table 305. As illustrated, global data offloading table 305 may include an APN field 310 and a data offloading parameters field 315. According to other implementations, global data offloading table 305 may include additional informational fields, fewer informational fields, and/or different informational fields than those illustrated in FIG. 3B and described herein. Additionally, according to other implementations, the information included in global data offloading table 305 may be stored in a data structure other than a table.

Global data offloading table 305 may include a common set of rules/policies applicable to a group of users. Global data offloading table 305 may be configured directly (e.g., by an administrator) or the information may be pushed from, for example, AAA 135/HSS 140.

APN field 310 may include APNs in which data offloading may be permitted and/or APNs in which data offloading may not be permitted.

Data offloading parameters field 315 may include parameters associated with the APN of APN field 310 as these parameters relate to data offloading. For example, data offloading parameters field 315 may specify one or multiple protocols, in-ports, out-ports, quality of service (QoS) Class Identifier (QCI), etc.

Figure 3C:
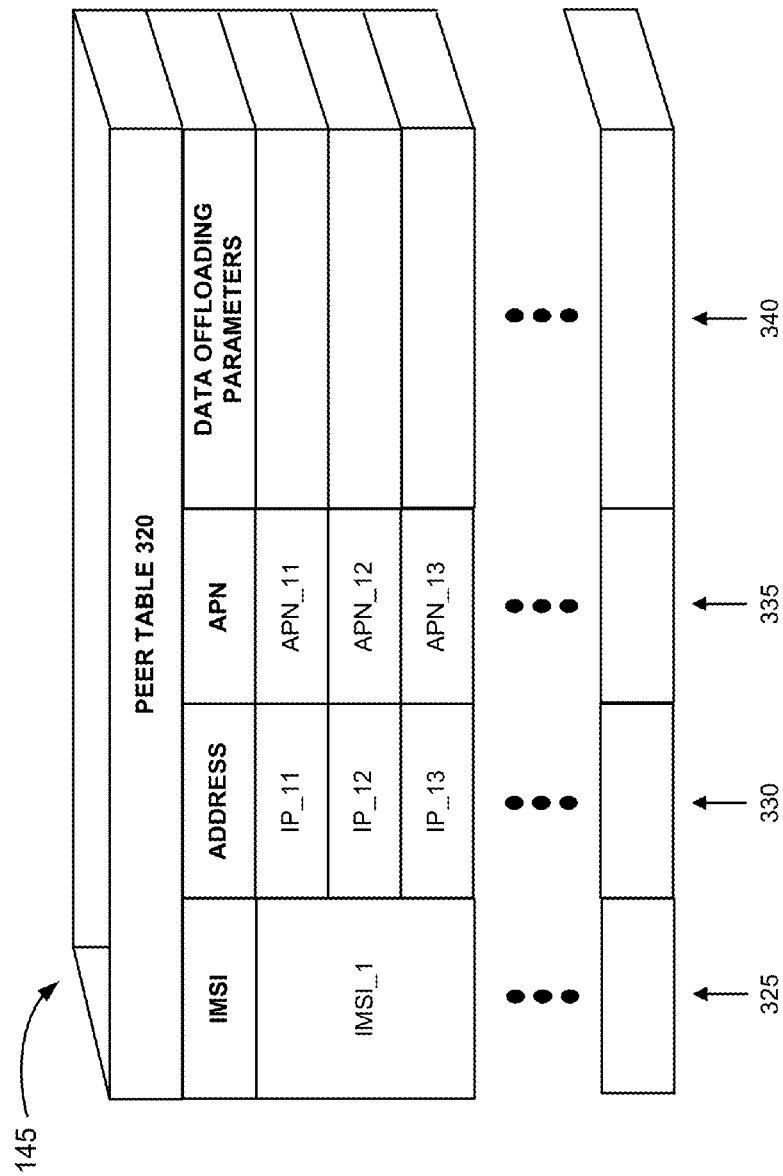
FIG. 3C is a diagram illustrating an exemplary peer table.

FIG. 3C is a diagram illustrating an exemplary peer table 320. As illustrated, peer table 320 may include an IMSI field 325, an address field 330, an APN field 335, and a data offloading parameters field 340. According to other implementations, peer table 320 may include additional informational fields, fewer informational fields, and/or different informational fields than those illustrated in FIG. 3C and described herein. Additionally, according to other implementations, the information included in peer table 320 may be stored in a data structure other than a table. According to an exemplary implementation, peer table 320 may define data flows in which data offloading is permitted.

IMSI field 325 may include one or multiple identifiers. The identifiers may relate to the user and/or UE 105. For example, IMSI field 325 may include an IMSI, a mobile station identification number (MSIN), an international mobile equipment identity (IMEI), a mobile equipment identifier (MEID), and/or some other type of user identifier and/or equipment identifier.

Address field 330 may include a network address. For example, address field 330 may correspond to an IP address associated with a UE.

APN field 335 may include APNs in which data offloading may be permitted and/or APNs in which data offloading may not be permitted.

Data offloading parameters field 340 may include parameters associated with the address field 330 and APN field 335 as these parameters relate to data offloading. For example, data offloading parameters field 315 may specify one or multiple protocols, in-ports, out-ports, quality of service (QoS) Class Identifier (QCI), etc.

Figure 3D:
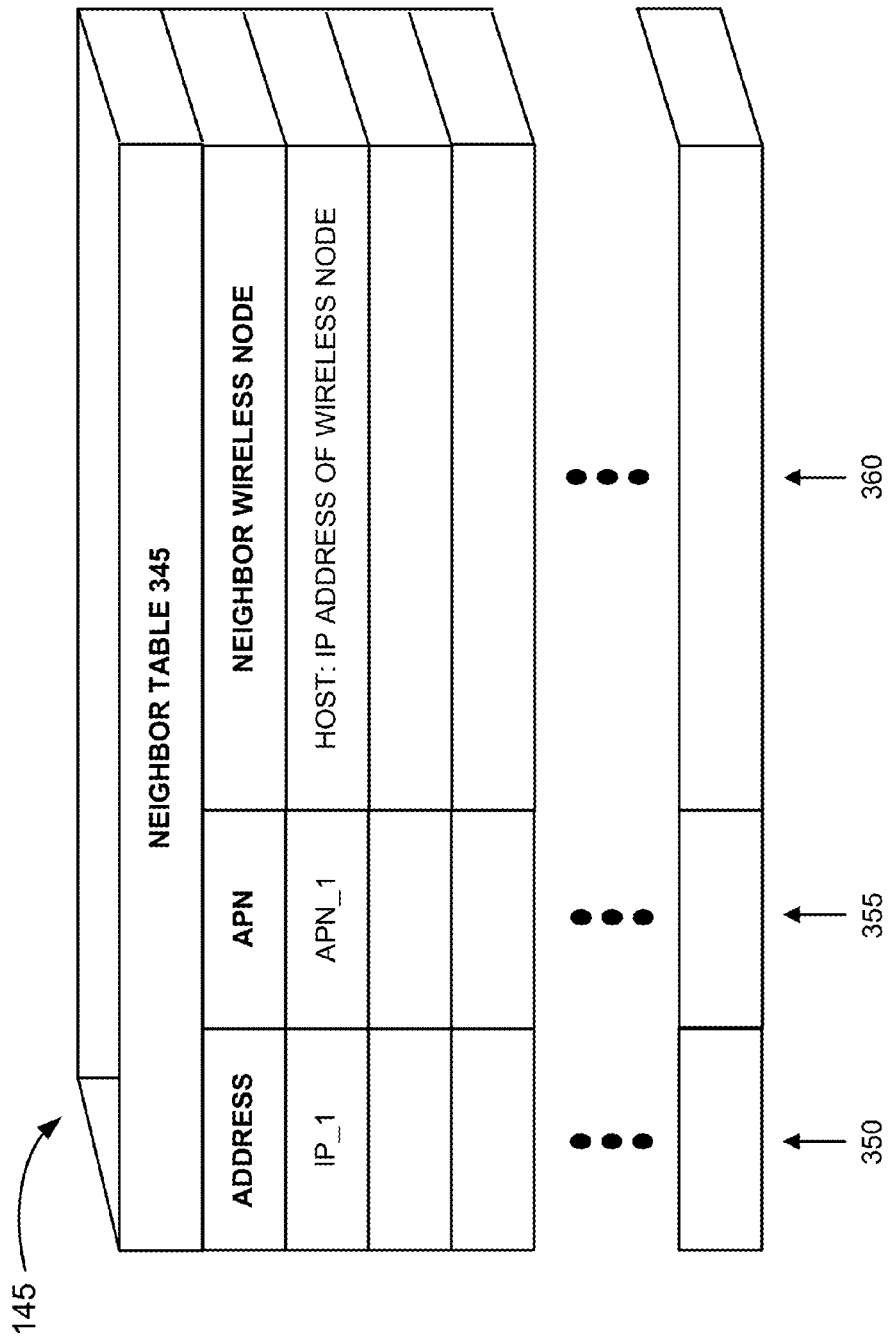
FIG. 3D is a diagram illustrating an exemplary neighbor table.

FIG. 3D is a diagram illustrating an exemplary neighbor table 345. As illustrated, neighbor table 345 may include an address field 350, an APN field 355, and a neighbor wireless node field 360. According to other implementations, neighbor table 345 may include additional informational fields, fewer informational fields, and/or different informational fields than those illustrated in FIG. 3D and described herein. Additionally, according to other implementations, the information included in neighbor table 345 may be stored in a data structure other than a table.

Address field 350 may include a network address. For example, address field 330 may correspond to an IP address associated with a UE.

APN field 355 may include APNs in which data offloading may be permitted and/or APNs in which data offloading may not be permitted.

Neighbor wireless node field 360 may include a network address associated with a neighbor wireless node. For example, the network address may correspond to an IP address.

As previously described, the wireless node and other devices in a network may use new or modified messaging to communicate in relation to data offloading. Additionally, devices in the network may include new and/or modified interfaces for communicating the new or modified messages.

FIG. 3E is a diagram illustrating exemplary modified interfaces for devices in the network. The devices may use the modified interfaces to communicate new or modified messages related to data offloading.

Referring to FIG. 3E, according to an exemplary implementation, eNB 110 and MME 125 may include a modified S1-MME interface (S1-MME+); SGW 115 and MME 125 may include a modified S11 interface (S11+); and PGW 120 and SGW 115 may include a modified S5 interface (S5+), to communicate new and/or modified messages. According to an exemplary implementation, the S1-MME+ interface, the S11+ interface, and the S5+ interface may permit the delegation of IP management, the passing of assigned IP addresses, and/or the authorization for data offloading. The S1-MME+ interface, the S11+ interface, and the S5+ interface may also permit the revocation of IP management and data offloading, which may include, for example, clearing an entry in a peer table, releasing resources, etc.

According to an exemplary implementation, a message may include an attribute value pair (AVP) to indicate information associated with data offloading. For example, a message may include an authorization AVP to indicate permission/denial per APN per subscriber for data offloading. A message may include a flow authorization AVP to indicate data offloading parameters (e.g., protocol, inports, outports, QoS, QCI, etc.). A message may include a service authorization AVP to permit/block data offloading with respect to a subscriber. A message may include a policy AVP to indicate data offloading policies. For example, the policy AVP may indicate global data offloading policies, such as services/applications in which data offloading is/is not provided, etc.

Additionally, according to an exemplary implementation, PGW 120 and PCRF 130 may include a modified Gx interface (Gx+) and PCRF 130 and AAA 135/HSS 140 may include a modified Sh interface (Sh+) or a modified Sp interface (Sp+) to communicate new and/or modified messages. According to an exemplary implementation, the Gx+ interface may permit the authorization (e.g., subscriber authorization, APN authorization, flow authorization, etc.) for data offloading. According to an exemplary implementation, the Sh+ interface or the Sp+ interface may also permit the authorization for data offloading.

As previously described, policies that include data offloading policies may be provided to a wireless node to permit the wireless node to determine whether data offloading is permitted, to perform data offloading, etc. Described below are exemplary implementations in which the policies may be provided to eNB 110 or SGW 115. According to an exemplary implementation, messages may include policy AVPs to carry policies related to data offloading.

Figure 4A:
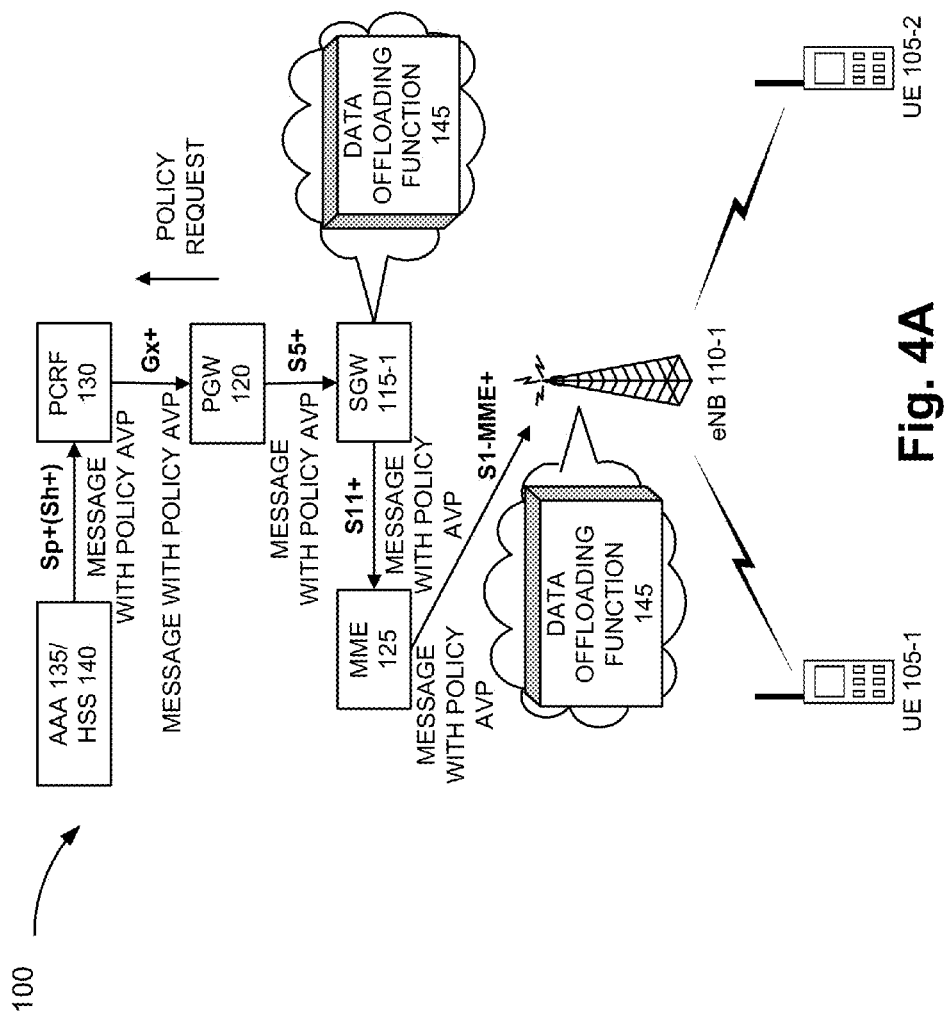
FIG. 4A is a diagram illustrating an exemplary implementation in which policies may be provided to an eNB and an SGW.

FIG. 4A is a diagram illustrating an exemplary implementation in which policies may be provided to eNB 110-1 and SGW 115-1. According to an exemplary implementation, PGW 120 may send a policy request to PCRF 130 (e.g., after UEs 105 have attached to network 100). The policy request may be sent over the Gx+ interface. PCRF 130 may receive the policy request and obtain the policies from AAA 135/HSS 140 over the Sp+ interface or the Sh+ interface. For example, AAA 135/HSS 140 may send a message with policy AVP(s). PCRF 130 may send the policies to PGW 120 over the Gx+ interface using a message with policy AVP(s). As further illustrated, PGW 120 may send a message with policy AVP(s) to SGW 115-1 over the S5+ interface; SGW 115-1 may send a message with policy AVP(s) to MME 125 over the S11+ interface; and MME 125 may send a message with policy AVP(s) to eNB 110-1 over the S1-MME+ interface.

Figure 4B:
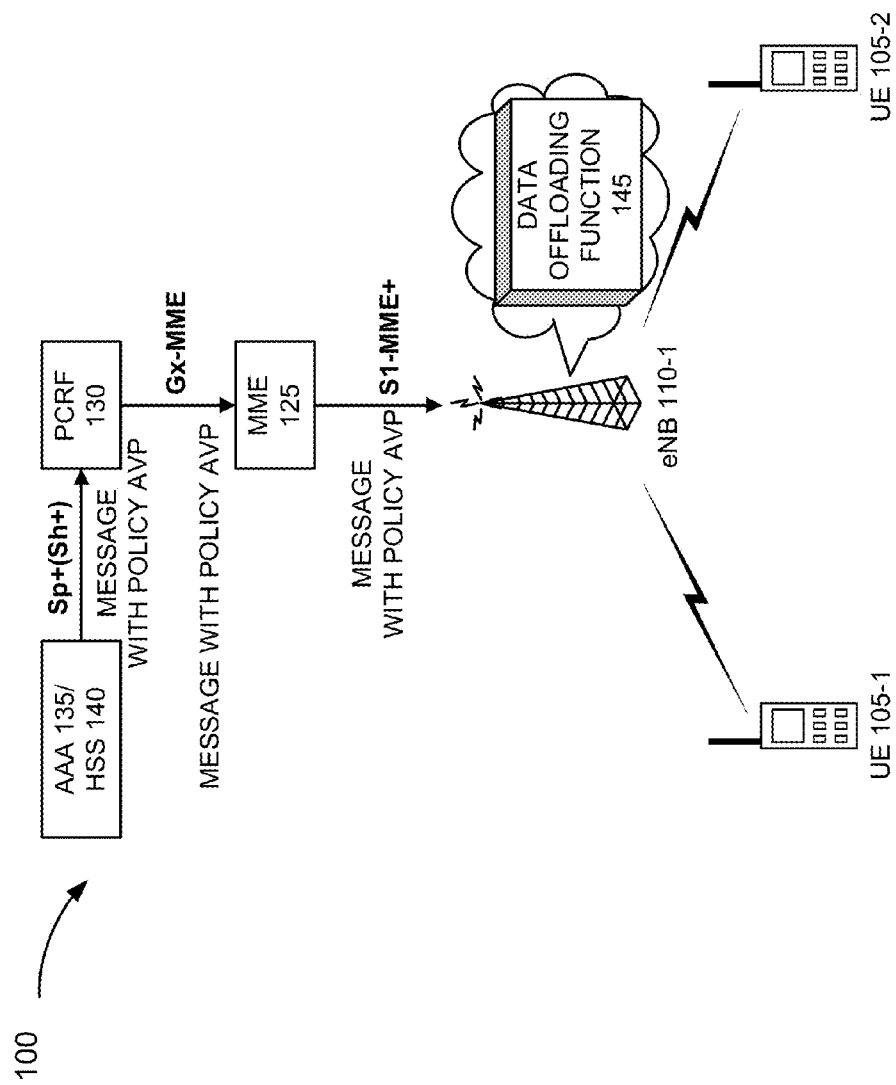
FIG. 4B is a diagram illustrating an exemplary implementation in which policies may be provided to an eNB.

According to another implementation, policies may be provided to the wireless node along a path different than the path illustrated and described with respect to FIG. 4A. For example, FIG. 4B is a diagram illustrating an exemplary implementation in which policies may be provided to eNB 110-1. According to an exemplary implementation, AAA 135/HSS 140 may send a message with policy AVP(s) to PCRF 130 over the Sp+ interface or the Sh+ interface. PCRF 130 may send the policies in a message with policy AVP(s) to MME 125 over a new Gx interface (Gx-MME). In turn, MME 125 may send the policies in a message with policy AVP(s) to eNB 110-1 over the S1-MME+ interface.

Figure 4C:
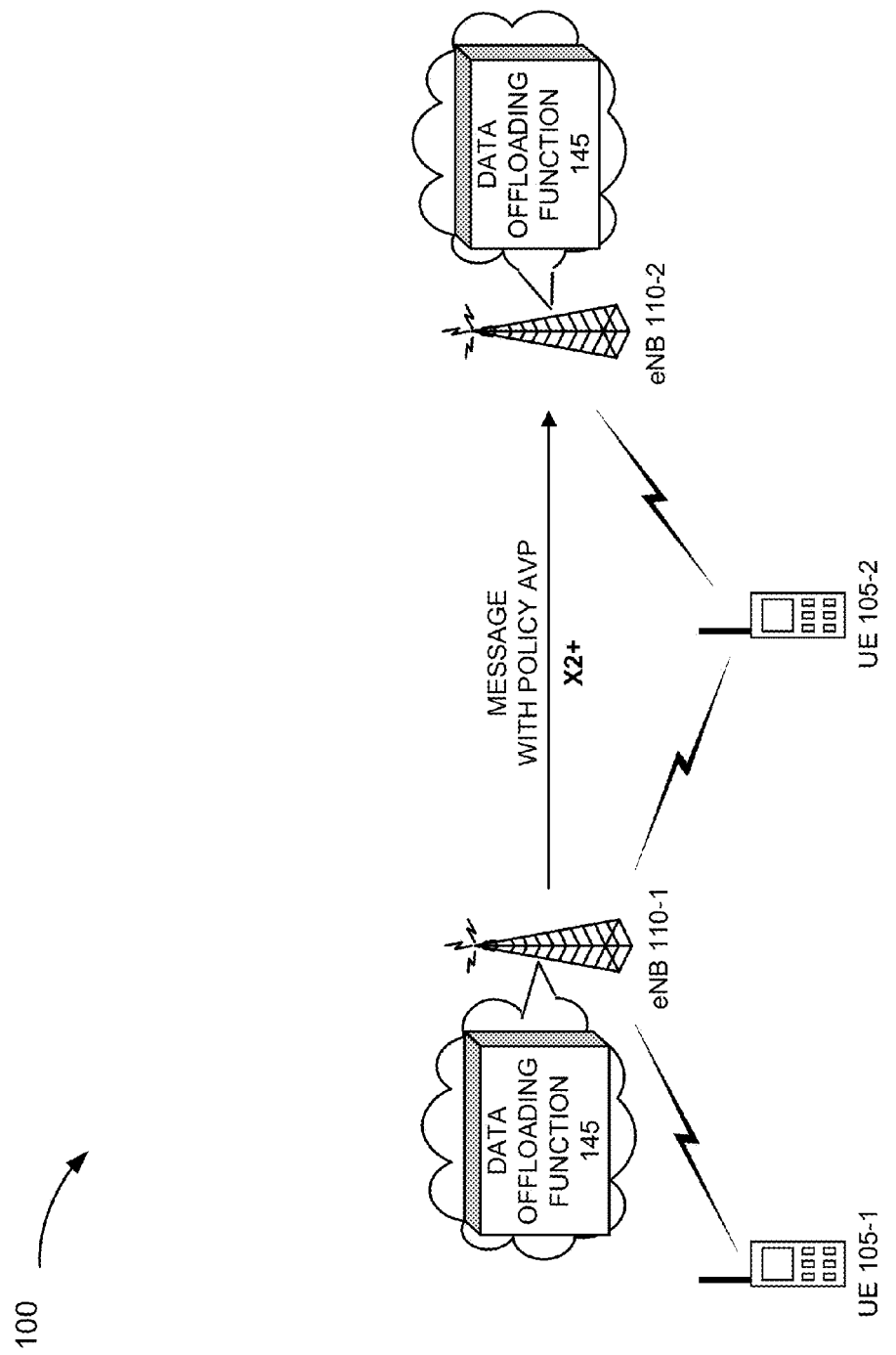
FIG. 4C is a diagram illustrating an exemplary implementation in which policies may be provided between eNBs.

According to another exemplary implementation, wireless nodes may provide policies to other wireless nodes during a handover or when data offloading involves two or more wireless nodes performing data offloading. For example, an eNB 110 may provide policies to another eNB 110 during a handover or when data offloading is being performed between eNBs 110. FIG. 4C is a diagram illustrating an exemplary implementation in which policies may be provided from one wireless node to another wireless node. As illustrated, during a handover associated with UE 105-2, eNB 110-1 may send a message with policy AVP(s) to eNB 110-2. According to another implementation, when data offloading is being performed between eNB 110-1 and eNB 110-2 (e.g., without a handover, such as between UE 105-1 and UE 105-3), eNB 110-1 may send a message with policy AVP(s) to eNB 110-2. As illustrated in FIG. 4C, eNB 110-1 may send the policies in the message with policy AVP(s) over a modified X2 interface (X2+interface).

Figure 4D:
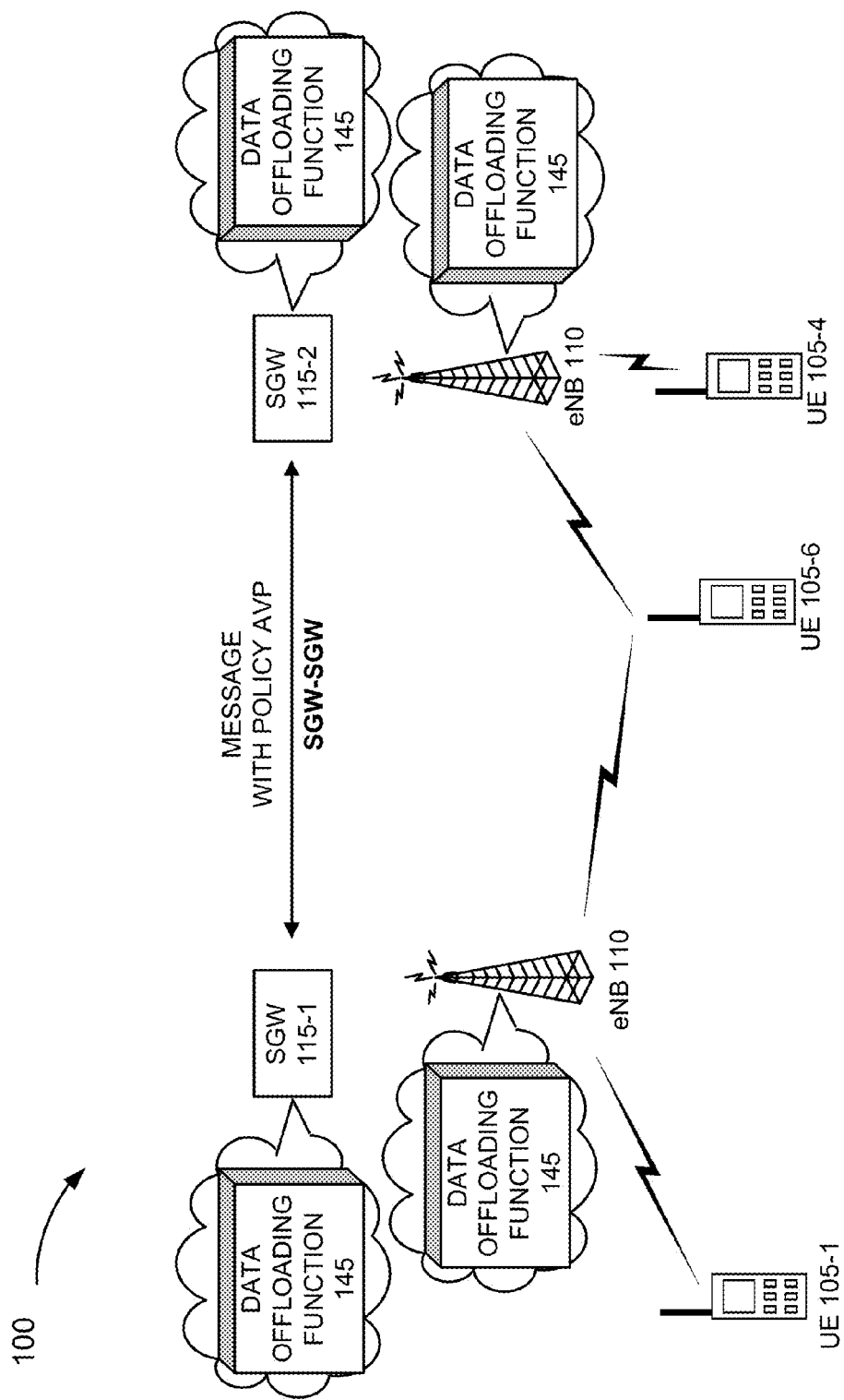
FIG. 4D is a diagram illustrating an exemplary implementation in which policies may be provided between SGWs.

According to another example, the wireless nodes may correspond to SGWs 115. FIG. 4D is a diagram illustrating an exemplary implementation in which policies may be provided from one wireless node to another wireless node. As illustrated, during a handover process associated with UE 105-6, SGW 115-1 may send a message with policy AVP(s) to SGW 115-2 over a new SGW-SGW interface. According to another exemplary implementation, although not illustrated, a message with policy AVP(s) may traverse one or multiple MMEs 125 to pass the policy AVP(s) from SGW 115-1 to SGW 115-2.

The examples for providing policies to a wireless node described herein are not exhaustive and other implementations not specifically described and/or illustrated may be used. For example, with respect to an LTE network, devices may use other paths for providing policies to a wireless node, which may include messages with AVPs, modified and/or new interfaces to communicate the messages with AVPs, etc. Additionally, with respect to networks other than LTE, devices may communicate policies in a manner similar to that described.

As previously described, the wireless node may determine whether data offloading is permitted and/or perform data offloading based on policies and/or other types of information. For example, the wireless node may access a global policy data offloading table 305 or a peer table 320. Described below are exemplary processes associated with the determining of whether data offloading is permitted and/or the performing of data offloading.

Figure 5A:
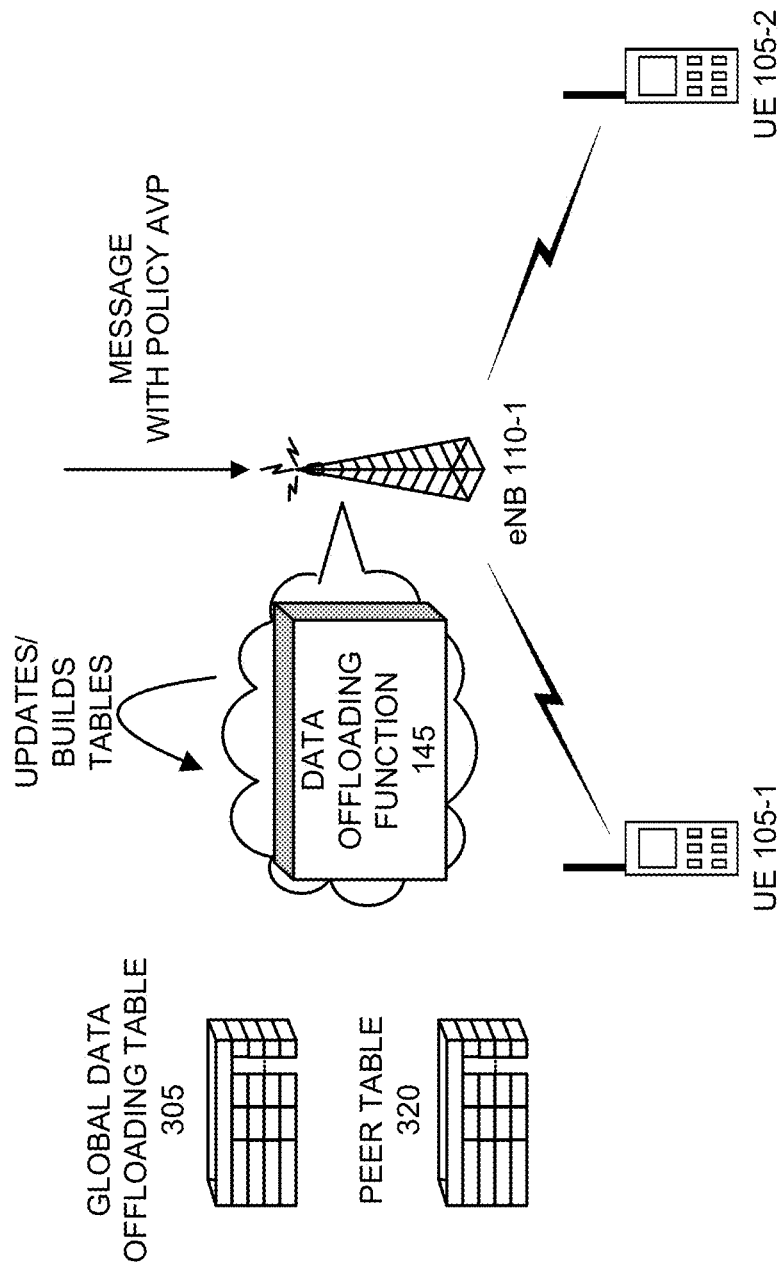
FIGS. 5A-5B are diagrams illustrating an exemplary process in which an eNB may determine whether data offloading is permitted.
Figure 5B:
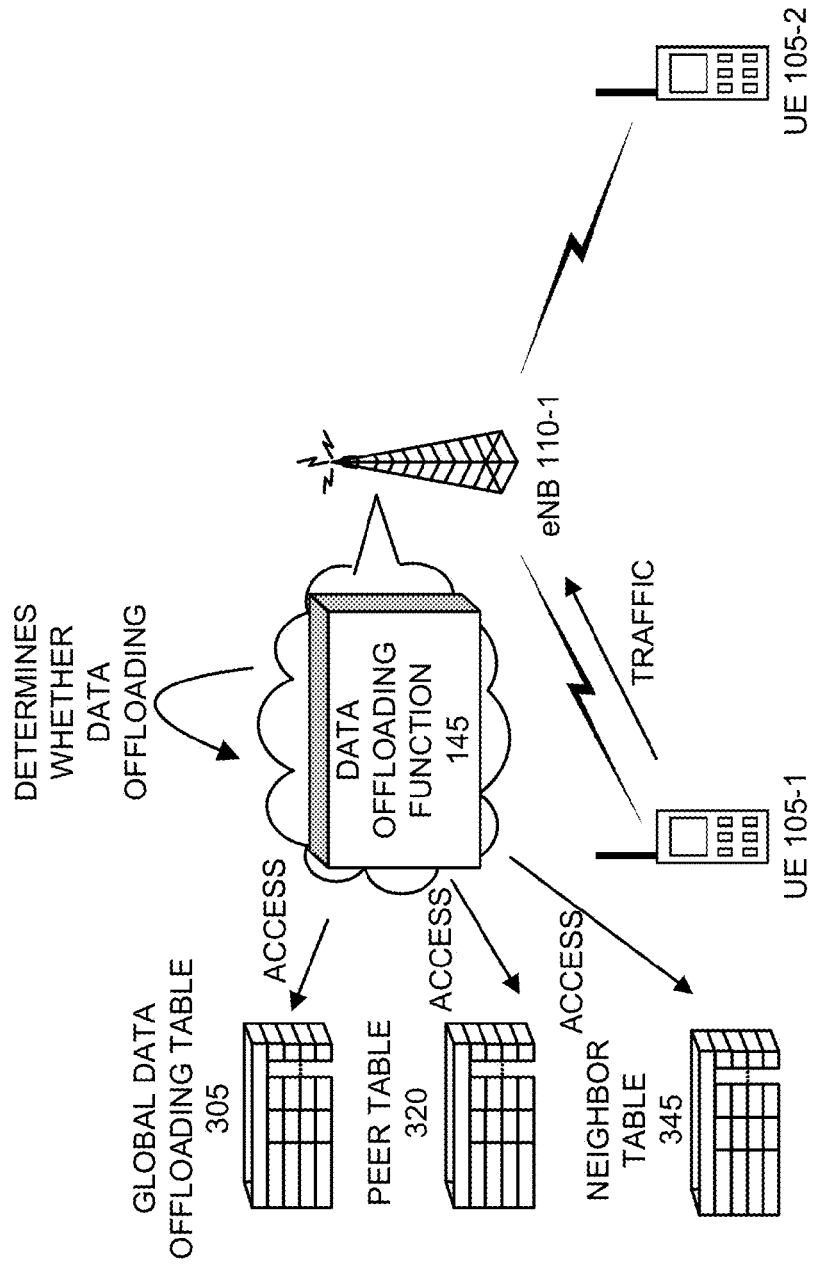
Figure 5C:
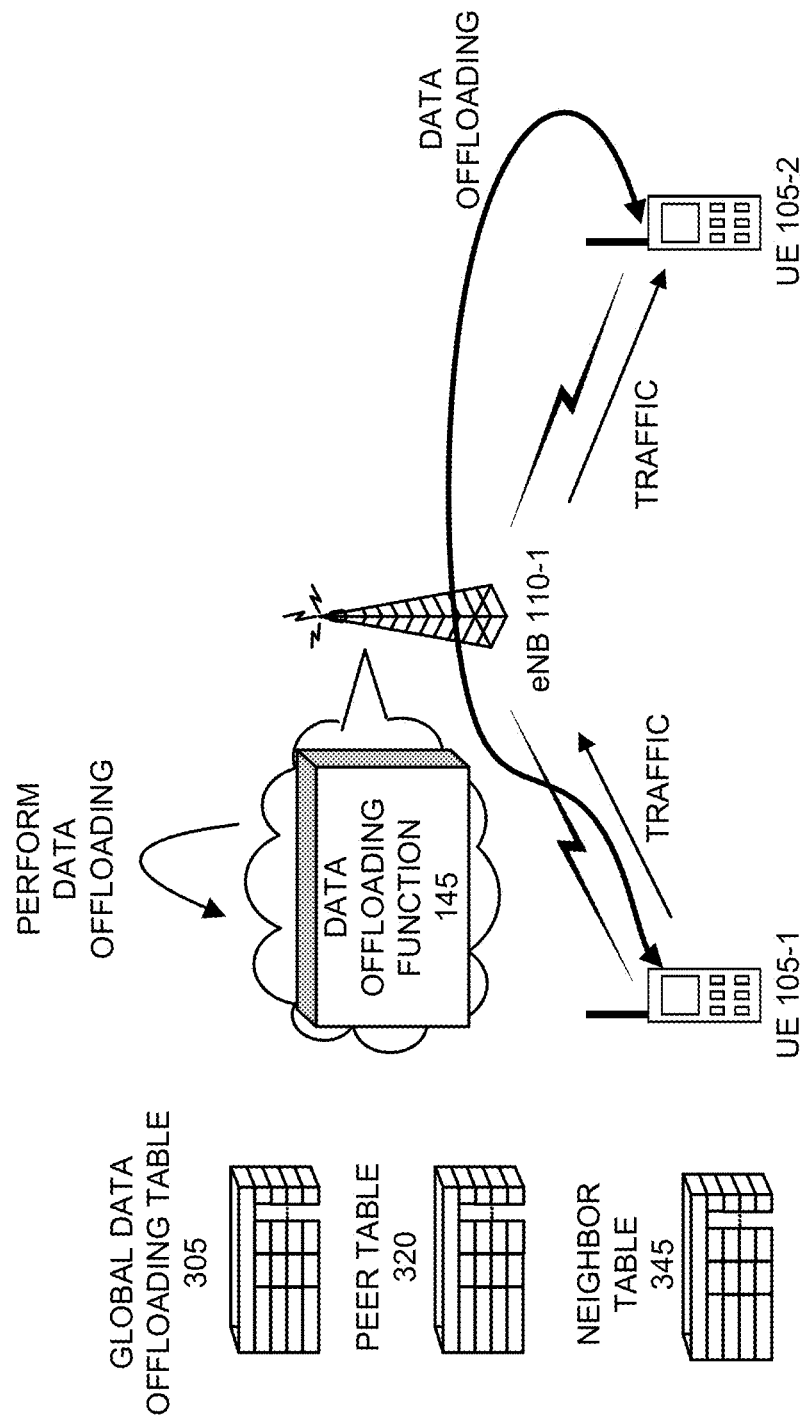
FIG. 5C is a diagram illustrating an exemplary process in which an eNB may perform data offloading.

FIGS. 5A-5B are diagrams illustrating an exemplary process in which eNB 110 may determine whether data offloading is permitted. Referring to FIG. 5A, a message with policy AVP(s) may be received by eNB 110-1. DOF 145 of eNB 110-1 may update/build tables (e.g., global data offloading table 305 and peer table 320) based on the policies received in the message with policy AVP(s). As illustrated in FIG. 5B, DOF 145 of eNB 110-1 may determine whether data offloading is permitted based on global data offloading table 305, peer table 320, and/or neighbor table 345. For example, assume eNB 110-1 receives traffic from UE 105-1. DOF 145 of eNB 110-1 may determine whether data offloading is permitted for this traffic. For example, according to an exemplary implementation, DOF 145 of eNB 110-1 may access global data offloading table 305 to determine whether the APN is included in global data offloading table 305. If the APN is included in global data offloading table 305, DOF 145 of eNB 110-1 may perform data offloading, as illustrated in FIG. 5C. If the APN is not included in global data offloading table 305, DOF 145 of eNB 110-1 may access peer table 320 and/or neighbor table 345. According to another implementation, DOF 145 of eNB 110-1 may access peer table 320 and/or neighbor table 345 even if the APN is included in global data offloading table 305. For example, DOF 145 may consider the information in peer table 320 to supersede the information in global data offloading table 305.

DOF 145 of eNB 110-1 may access peer table 320 to determine whether data offloading is permitted. For example, if the destination address is included in address field 330 and/or the APN is included in APN field 335, DOF 145 may determine that data offloading is permitted. DOF 145 of eNB 110-1 may access neighbor table 345 to determine whether data offloading is permitted. For example, if the destination address is included in address field 350 and/or the APN is included in APN field 355, DOF 145 may determine that data offloading is permitted. As an example, eNB 110-1 may route the traffic to another eNB (e.g., eNB-2) (not illustrated). As previously described, when DOF 145 determines that data offloading is permitted, the traffic may be locally routed, as illustrated in FIG. 5C.

Figure 5D:
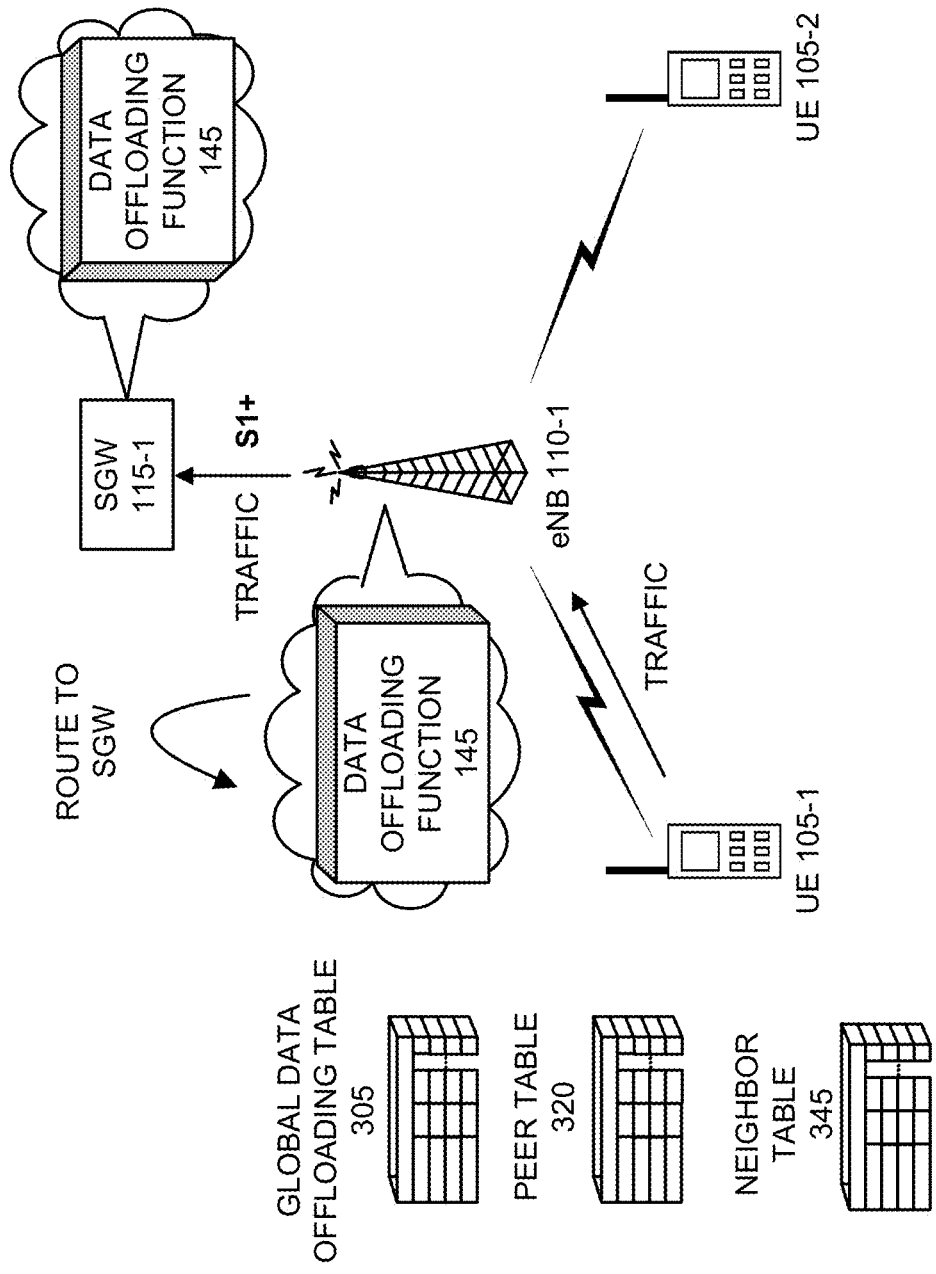
FIG. 5D is a diagram illustrating an exemplary process in which an eNB may route traffic to an SGW.

In the event that DOF 145 of eNB 110-1 determines that data offloading is not permitted (e.g., based on global data offloading table 305, peer table 320, and/or neighbor table 345), DOF 145 of eNB 110-1 may route the traffic to SGW 115-1 over a modified S1 interface (S1+), as illustrated in FIG. 5D.

Figure 5E:
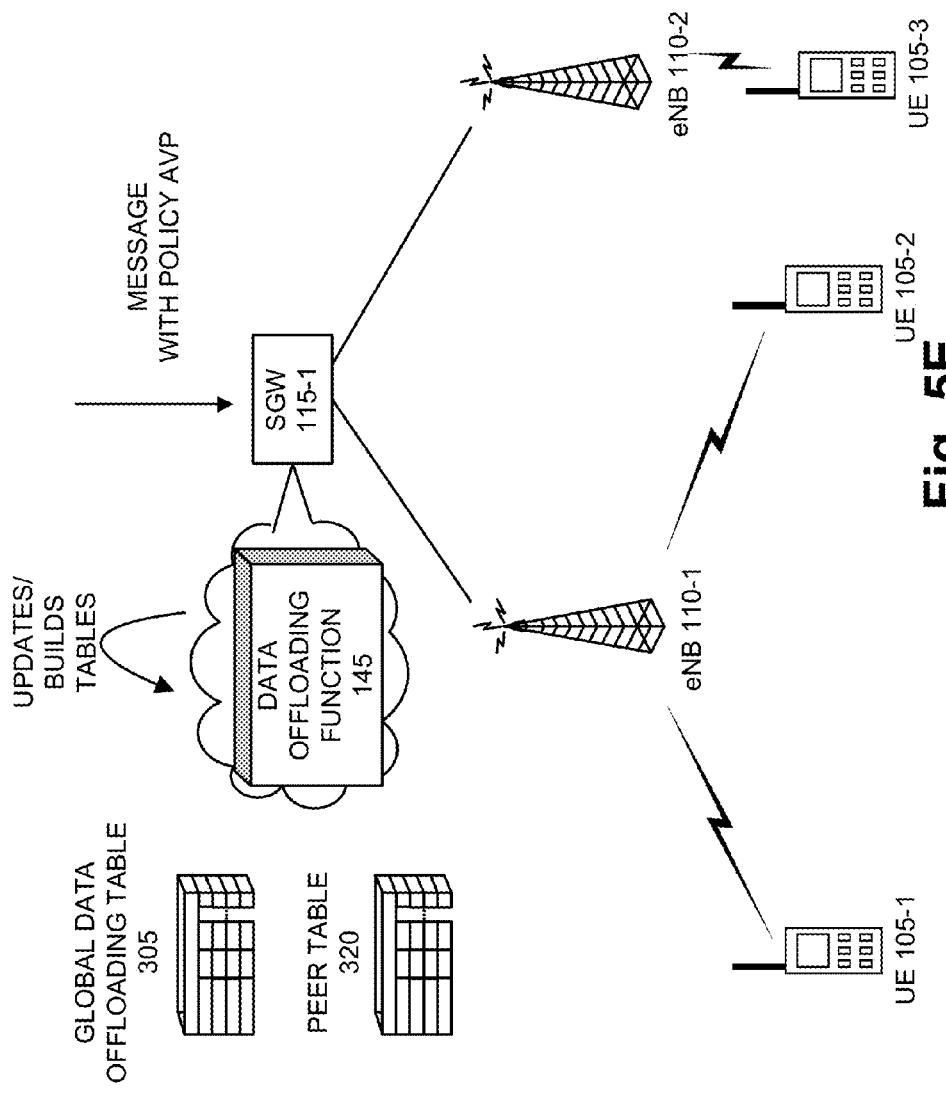
FIGS. 5E-5F are diagrams illustrating an exemplary process in which an SGW may determine whether data offloading is permitted.
Figure 5F:
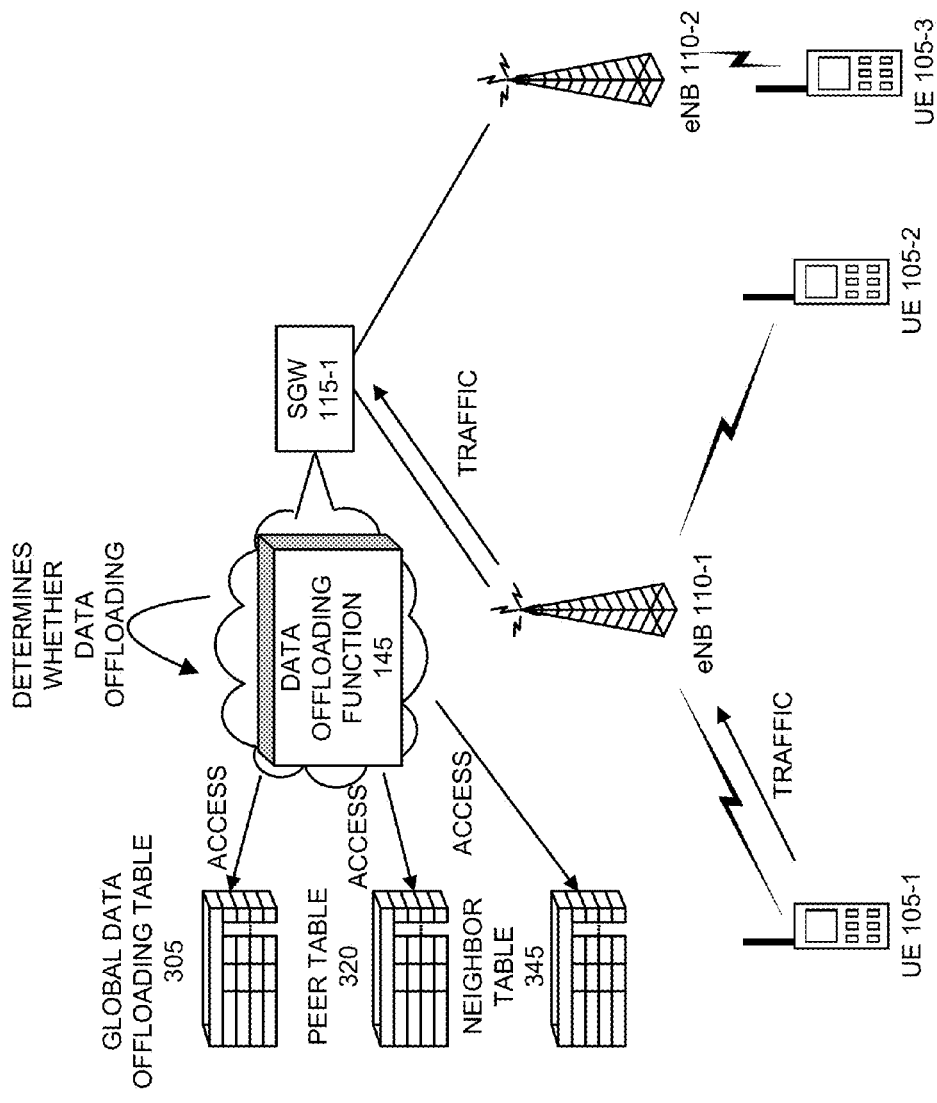
Figure 5G:
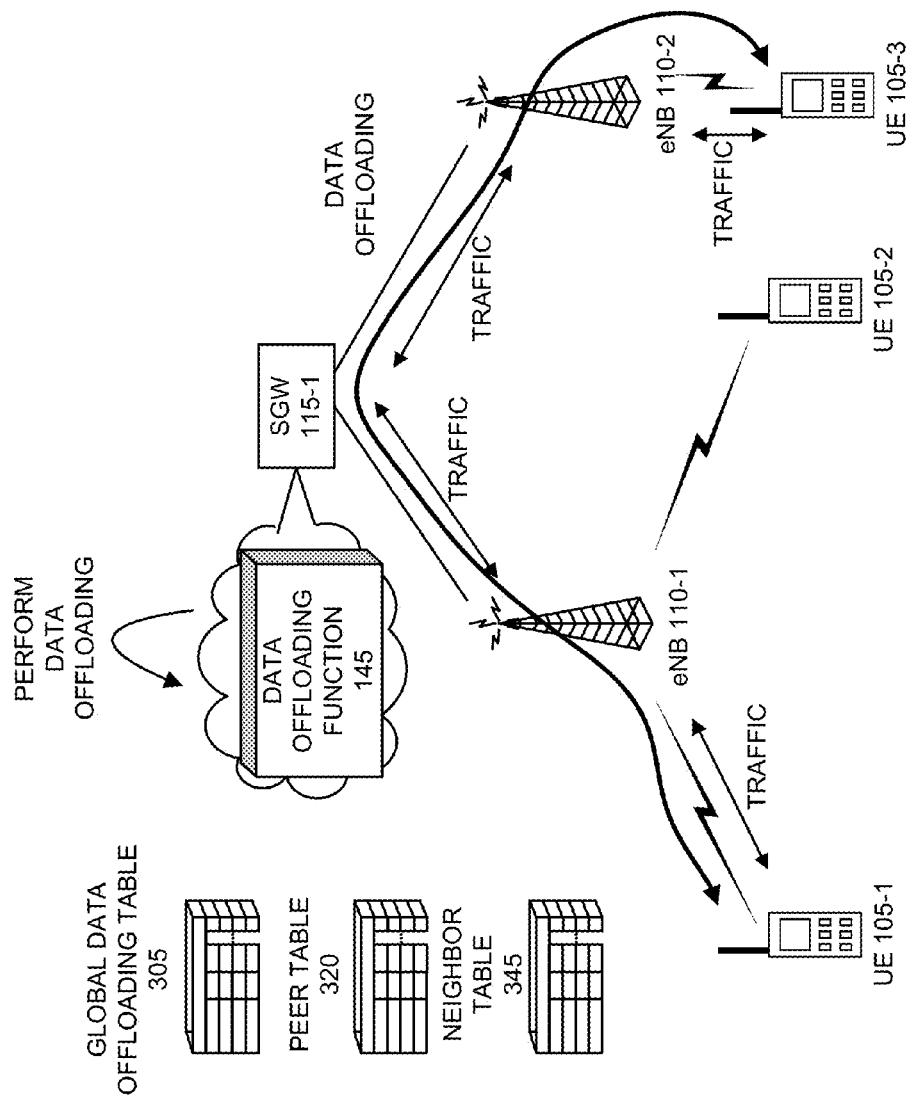
FIG. 5G is a diagram illustrating an exemplary process in which an SGW may perform data offloading.

Referring to FIG. 5E, a message with policy AVP(s) may be received by SGW 115-1. DOF 145 of SGW 115-1 may update/build tables (e.g., global data offloading table 305 and peer table 320) based on the policies received in the message with policy AVP(s). As illustrated in FIG. 5F, DOF 145 of SGW 115-1 may determine whether data offloading is permitted based on global data offloading table 305, peer table 320, and/or neighbor table 345. For example, assume SGW 115-1 receives traffic from UE 105-1 via eNB 110-1 based on the scenario described with respect to FIG. 5D. DOF 145 of SGW 115-1 may determine whether data offloading is permitted for this traffic. For example, according to an exemplary implementation, DOF 145 of SGW 115-1 may access global data offloading table 305 to determine whether the APN is included in global data offloading table 305. If the APN is included in global data offloading table 305, DOF 145 of SGW 115-1 may perform data offloading, as illustrated in FIG. 5G. If the APN is not included in global data offloading table 305, DOF 145 of SGW 115-1 may access peer table 320 and/or neighbor table 345. According to another implementation, DOF 145 of SGW 115-1 may access peer table 320 and/or neighbor table 345 even if the APN is included in global data offloading table 305. For example, DOF 145 may consider the information in peer table 320 to supersede the information in global data offloading table 305.

DOF 145 of SGW 115-1 may access peer table 320 to determine whether data offloading is permitted. For example, if the destination address is included in address field 330 and/or the APN is included in APN field 335, DOF 145 may determine that data offloading is permitted. As an example, DOF 145 may route the traffic to another eNB (e.g., eNB 110-2) that is controlled by SGW 115-1. DOF 145 of SGW 115-1 may access neighbor table 345 to determine whether data offloading is permitted. For example, if the destination address is included in address field 350 and/or the APN is included in APN field 355, DOF 145 may determine that data offloading is permitted. As an example, SGW 115-1 may route the traffic to another SGW (e.g., SGW 115-2) (not illustrated). As previously described, when DOF 145 determines that data offloading is permitted, the traffic may be locally routed, as illustrated in FIG. 5G.

Figure 5H:
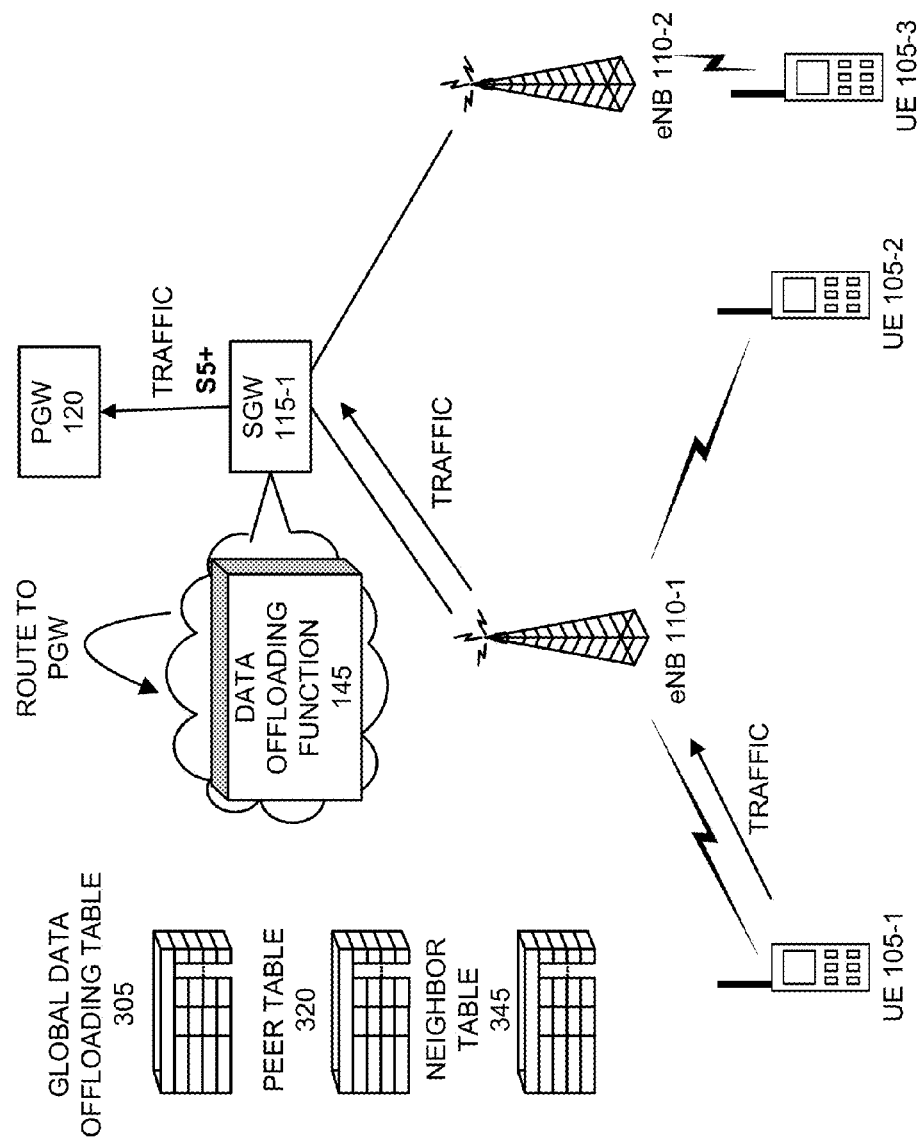
FIG. 5H is a diagram illustrating an exemplary process in which an SGW may route traffic to a PGW.

In the event that DOF 145 of SGW 115-1 determines that data offloading is not permitted (e.g., based on global data offloading table 305, peer table 320, and/or neighbor table 345), DOF 145 of SGW 115-1 may route the traffic to PGW 120 over the modified S5 interface (S5+), as illustrated in FIG. 5H.

According to other exemplary embodiments, data offloading may be extended to other devices (e.g., a HeNB, a UE-GW, some other type of wireless node, etc.). For example, users may be located within the same picocell, femtocell, etc. According to such instances, data offloading may be extended to, for example, a HeNB or to a UE-GW.

Figure 6:
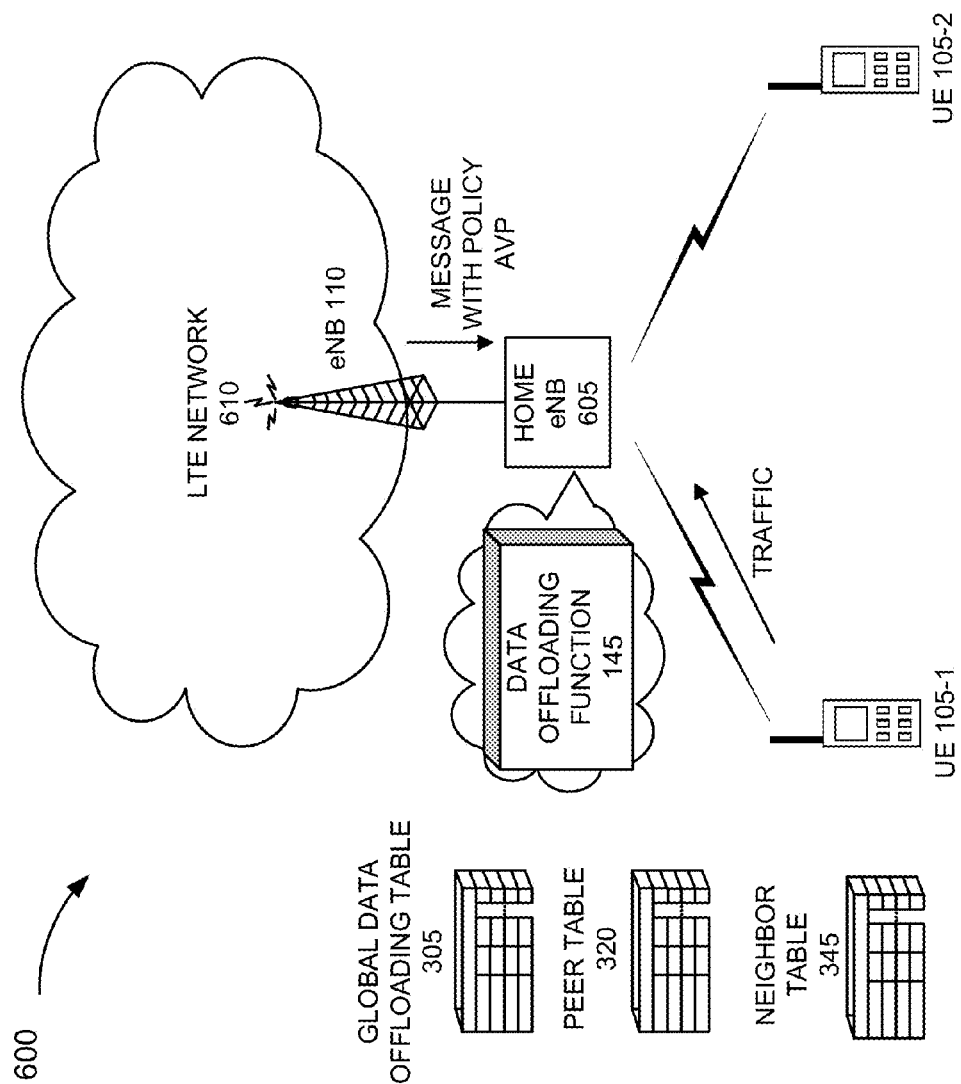
FIG. 6 is a diagram illustrating another exemplary network in which a home eNodeB (HeNB) may determine and perform data offloading.

FIG. 6 is a diagram illustrating another exemplary network 600 in which a HeNB may determine and perform data offloading. As illustrated, network 600 may include, among other devices and networks, UEs 105, a HeNB 605 that includes DOF 145, eNB 110, and an LTE network 610.

The number of devices and configuration in network 600 is exemplary and provided for simplicity. In practice, network 600 may include more devices, fewer devices, different devices, and/or differently arranged devices than those illustrated in FIG. 6. For example, network 600 may include a gateway (e.g., a HeNB gateway), a relay node, a picocell, a radio node, a UE-GW, etc. According to other implementations, HeNB 605 may not include DOF 145 and may rely on authorization from higher layers of network 600 to determine whether data offloading may be performed.

As illustrated, according to an exemplary implementation, DOF 145 may receive a message with policy AVP(s) (e.g., from eNB 110). DOF 145 of HeNB 605 may determine whether data offloading is permitted based on global data offloading table 305, peer table 320, and/or neighbor table 345, in a manner similar to that previously described. DOF 145 of HeNB 605 may perform data offloading when it is determined that data offloading is permitted. According to such an implementation, network resources associated with LTE network 610 may be conserved. DOF 145 of HeNB 605 may route traffic to eNB 110 or some other higher layer device when HeNB 605 determines that data offloading is not permitted.

Figure 7:
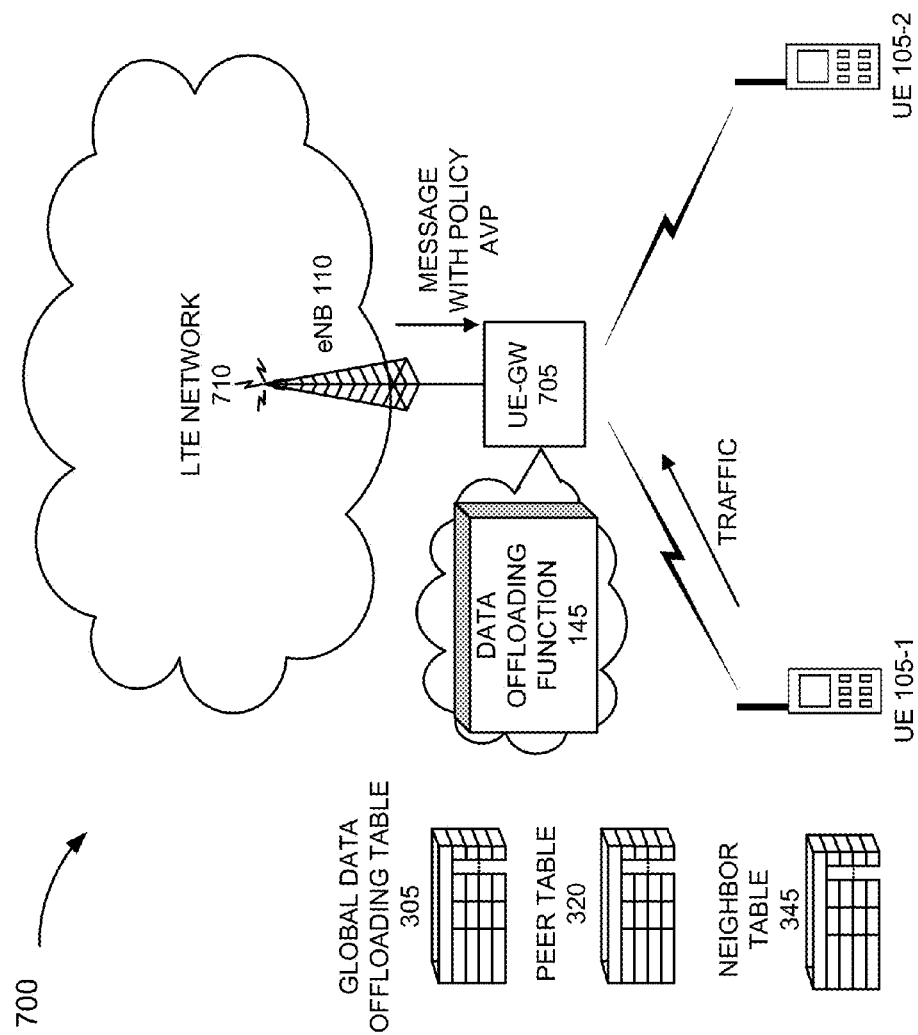
FIG. 7 is a diagram illustrating yet another exemplary network in which a user equipment-gateway (UE-GW) may determine and perform data offloading.

FIG. 7 is a diagram illustrating another exemplary network 700 in which a UE-GW may determine and perform data offloading. As illustrated, network 700 may include, among other devices and networks, UEs 105, a UE-GW 705 that includes DOF 145, eNB 110, and an LTE network 710.

The number of devices and configuration in network 700 is exemplary and provided for simplicity. In practice, network 700 may include more devices, fewer devices, different devices, and/or differently arranged devices than those illustrated in FIG. 7. For example, network 700 may include a relay node, a picocell, a radio node, a HeNB, etc. According to other implementations, UE-GW 705 may not include DOF 145 and may rely on authorization from higher layers of network 700 to determine whether data offloading may be performed.

As illustrated, according to an exemplary implementation, DOF 145 may receive a message with policy AVP(s) (e.g., from eNB 110). DOF 145 of UE-GW 705 may determine whether data offloading is permitted based on global data offloading table 305, peer table 320, and/or neighbor table 345, in a manner similar to that previously described. DOF 145 of UE-GW 705 may perform data offloading when it is determined that data offloading is permitted. According to such an implementation, network resources associated with LTE network 710 may be conserved. DOF 145 of UE-GW 705 may route traffic to eNB 110 or some other higher layer device when UE-GW 705 determines that data offloading is not permitted.

The examples for performing data offloading described herein are not exhaustive and other implementations not specifically described and/or illustrated may be used. For example, data offloading may be performed between eNBs, between SGWs, or between other types of wireless nodes associated with an LTE network or some other type of network.

Figure 8:
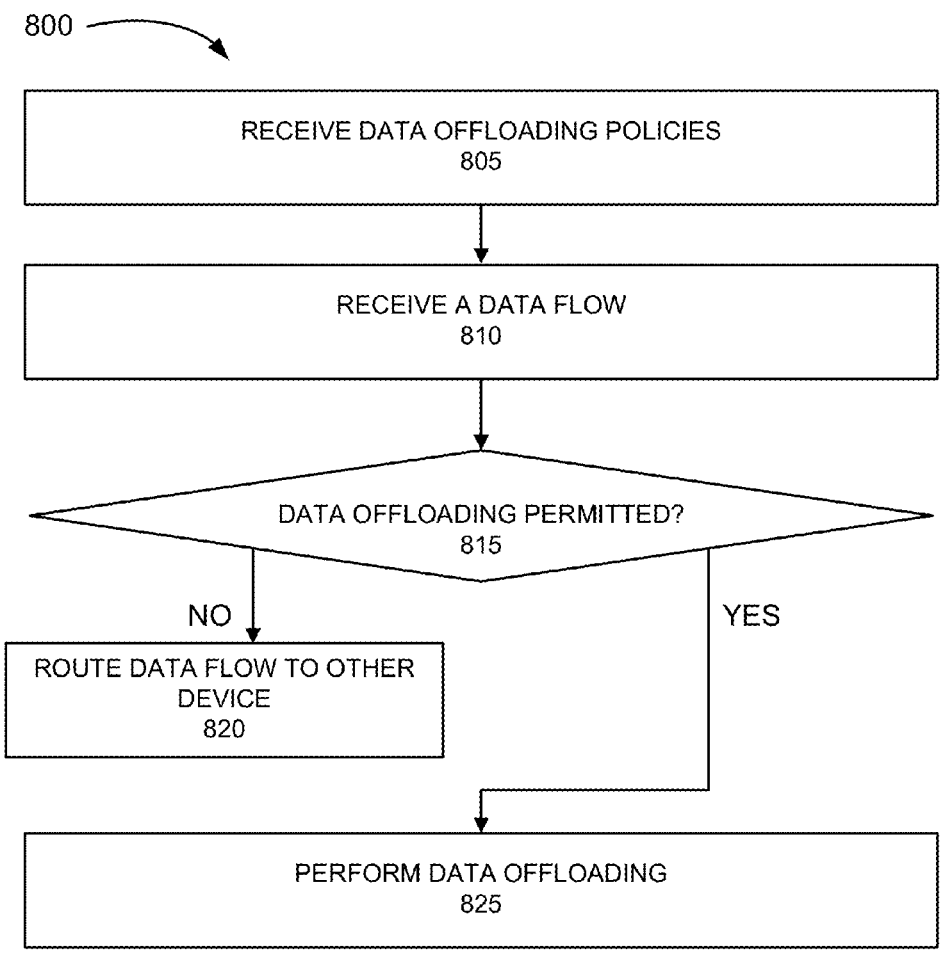
FIG. 8 is a flow diagram illustrating an exemplary process for performing data offloading.

FIG. 8 is a flow diagram illustrating an exemplary process 800 for performing data offloading. According to an exemplary embodiment, process 800 may be performed by eNB 110 or SGW 115. According to other implementations, process 800 may be performed by a different type of wireless node associated with a network.

Process 800 may include receiving data offloading policies (block 805). For example, as previously described, the wireless node may receive policies that include data offloading policies. The data offloading policies may include, for example, global data offloading policies, subscriber data offloading policies, per flow or per APN data offloading policies, or the like.

A data flow associated with a user device may be received (block 810). For example, as previously illustrated and described, the wireless node may receive a data flow. By way of example, the data flow may correspond to a mobile-to-mobile flow, a peer-to-peer application flow, etc.

It may be determined whether data offloading may be performed (block 815). For example, as previously described, the wireless node may access the data offloading policies to determine whether data offloading is permitted. According to an exemplary implementation, as previously described, the wireless node may access a global data offloading table, a peer table, and/or a neighbor table to determine whether data offloading may be performed.

If it is determined that data offloading may not be performed (block 815—NO), the data flow may be routed to another device (block 820). For example, as previously described, when the wireless node corresponds to an eNB, the wireless node may route the traffic to an SGW. According to another example, as previously described, when the wireless node corresponds to an SGW, the wireless node may route the traffic to a PGW. According to still other implementations, the wireless node may route the traffic to another device that may be hierarchically higher relative to the wireless node (e.g., in terms of layer, functionality, etc.). For example, in a GSM network, when the wireless node corresponds to a base station, the wireless node may route the traffic to a BSC.

If it is determined that data offloading may be performed (block 815—YES), data offloading may be performed (block 825). For example, as previously described, the wireless node may route the data flow as locally as possible. According to an example, when the wireless node corresponds to an eNB, the data flow may traverse no higher than the eNB. According to another example, when the wireless node corresponds to an SGW, the data flow may traverse no higher than the SGW. According to other implementations, data offloading may include multiple wireless nodes. For example, the data offloading may involve multiple eNBs when one user device is attached to one eNB and another user device is attached to the other eNB. According to another example, the data offloading may involve multiple SGWs when one user device is attached to an eNB under the control of one SGW while the other user device is attached to another eNB under the control of the other SGW.

Although FIG. 8 illustrates an exemplary process 800 for performing data offloading, according to other implementations, process 800 may include additional operations, fewer operations, and/or different operations than those illustrated in FIG. 8 and described.

The foregoing description of implementations provides illustration, but is not intended to be exhaustive or to limit the implementations to the precise form disclosed. Accordingly, modifications to the implementations described herein may be possible. For example, as previously described, data offloading may be implemented in networks other than LTE.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 8, the order of the blocks may be modified in other implementations. Further, non-dependent blocks may be performed in parallel. Additionally, with respect to other processes described in this description, the order of operations may be different according to other implementations, and/or operations may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, or a combination with firmware, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
   receiving, by a wireless node, policies for data offloading;
   identifying, by the wireless node, a user associated with a data flow to which a user device is attached;
   determining, by the wireless node, whether data offloading is permitted for the user based on the policies;
   performing, by the wireless node, data offloading when it is determined that data offloading is permitted for the user, wherein data offloading includes routing the data flow to another user device via one of a lower layer traffic aggregation device relative to the wireless node, a lower hierarchical controlling device relative to the wireless node, or a peer wireless node relative to the wireless node and without the data flow traversing any higher layer traffic aggregation device relative to the wireless node or any higher hierarchical controlling device relative to the wireless node; and
   routing, by the wireless node, the data flow to a higher layer traffic aggregation device relative to the wireless node or a higher hierarchical controlling device relative to the wireless node when it is determined that data offloading is not permitted for the user, and wherein the wireless node comprises one of an evolved Node-B, a Node-B, a base station, a user device gateway, or a serving gateway of a Long Term Evolution network to which the user device is attached.

2. The method of claim 1, further comprising:
   determining, by the wireless node, whether data offloading is permitted for the user based on whether the user has a subscription for data offloading, and wherein the data flow does not include a signaling flow associated with attachment to a network of the wireless node and by the user device.

3. The method of claim 1, further comprising:
   identifying an access point name associated with the data flow; and determining whether data offloading is permitted based on the access point name.

4. The method of claim 1, further comprising:
identifying a destination address associated with the data flow;
identifying an access point name associated with the data flow;
identifying a neighbor wireless node address associated with the data flow; and
determining whether data offloading is permitted based on the destination address, the access point name, and the neighbor wireless node address.

5. The method of claim 1, wherein the wireless node comprises one of an evolved Node-B, a Node-B, a base station, a user device gateway, a serving gateway of a Long Term Evolution network, or a radio node to which the user device is attached data flow is a mobile-to-mobile data flow or a peer-to-peer application data flow.

6. The method of claim 1, further comprising:
identifying a protocol associated with the data flow;
identifying in-ports and out-ports associated with the data flow; and
determining whether data offloading is permitted based on the protocol and the in-ports and out-ports.

7. The method of claim 1, further comprising:
identifying a level of quality of service associated with the data flow; and
performing the data offloading in accordance with the level of quality of service.

8. The method of claim 1, further comprising:
routing the data flow toward the least one of the higher layer traffic aggregation device or the higher hierarchical controlling device when it is determined that data offloading is not permitted performing a handover between the wireless node and another wireless node; and
transmitting the policies for data offloading from the wireless node to the other wireless node based on the handover.

9. The method of claim 1, wherein when the wireless node comprises the evolved node B, the method further comprises:
routing the data flow to the serving gateway when it is determined that data offloading is not permitted; and
wherein when the wireless node comprises the serving gateway, the method further comprises:
routing the data flow to a packet data network gateway when it is determined that data offloading is not permitted.

10. A wireless node comprising:
one or more memories to store instructions; and
one or more processors to execute the instructions in the one or more memories to:
receive policies for data offloading;
identify a user associated with a data flow to which a user device is attached;
determine whether data offloading is permitted for the user based on the policies;
perform data offloading when it is determined that data offloading is permitted for the user, wherein data offloading includes routing the data flow to another user device via one of a lower layer traffic aggregation device relative to the wireless node, a lower hierarchical controlling device relative to the wireless node, or a peer wireless node relative to the wireless node and without the data flow traversing any higher layer traffic aggregation device relative to the wireless node or any higher hierarchical controlling device relative to the wireless node; and
route the data flow to a higher layer traffic aggregation device relative to the wireless node or a higher hierarchical controlling device relative to the wireless node when it is determined that data offloading is not permitted for the user, and wherein the wireless node comprises one of an evolved Node-B, a Node-B, a base station, a user device gateway, or a serving gateway of a Long Term Evolution network to which the user device is attached.

11. The wireless node of claim 10, wherein the one or more processors are to execute instructions to:
identify an access point name associated with the data flow; and
determine whether data offloading is permitted based on the access point name.

12. The wireless node of claim 10, wherein the one or more processors are to execute instructions to:
identify a destination address associated with the data flow;
identify an access point name associated with the data flow;
identify a neighbor wireless node address associated with the data flow; and
determine whether data offloading is permitted based on the destination address, the access point name, and the neighbor wireless node address.

13. The wireless node of claim 10, wherein the one or more processors are to execute instructions to:
identify a protocol associated with the data flow;
identify in-ports and out-ports associated with the data flow; and
determine whether data offloading is permitted based on the protocol and the in-ports and out-ports.

14. The wireless node of claim 10, wherein the wireless node comprises one of a home evolved Node-B (home eNB), a user device gateway, a serving gateway of a Long Term Evolution network, an eNB, a Node-B, a base station, or a radio node data flow is a mobile-to-mobile data flow or a peer-to-peer application data flow.

15. The wireless node of claim 10, wherein the one or more processors are to execute instructions to:
route the data flow to the least one of the higher layer traffic aggregation device or the higher hierarchical controlling device when it is determined that data offloading is not permitted perform a handover between the wireless node and another wireless node; and
transmit the policies for data offloading from the wireless node to the other wireless node based on the handover.

16. The wireless node of claim 10, wherein when performing data offloading, the one or more processors are to execute instructions to:
determine whether data offloading is permitted for the user based on whether the user has a subscription for data offloading, and wherein the data flow is a user device-to-user device data flow pertaining to the user device and the other user device.

17. The wireless node of claim 10, wherein when identifying the user, the one or more processors are to execute instructions to:
identify an identifier associated with the user, wherein the identifier corresponds to an International Mobile Subscriber Identity.

18. The wireless node of claim 10, wherein the one or more components are further configured to:
identify a level of quality of service associated with the data flow; and perform the data offloading in accordance with the level of quality of service.

19. A non-transitory computer-readable storage medium storing instructions executable by at least one processor of a wireless node, the non-transitory computer-readable storage medium storing instructions for:

receiving policies for data offloading;

identifying a user associated with a data flow to which a user device is attached;

determining whether data offloading is permitted for the user based on the policies;

performing data offloading when it is determined that data offloading is permitted for the user, wherein data offloading includes routing the data flow to another user device via one of a lower layer traffic aggregation device relative to the wireless node, a lower hierarchical controlling device relative to the wireless node, or a peer wireless node relative to the wireless node and without the data flow traversing any higher layer traffic aggregation device relative to the wireless node or any higher hierarchical controlling device relative to the wireless node; and routing the data flow to a higher layer traffic aggregation device relative to the wireless node or a higher hierarchical controlling device relative to the wireless node when it is determined that data offloading is not permitted for the user, and wherein the wireless node comprises one of an evolved Node-B, a Node-B, a base station, a user device gateway, or a serving gateway of a Long Term Evolution network to which the user device is attached.

20. The non-transitory computer-readable storage medium of claim 19, further comprising one or more instructions for:

identifying an access point name associated with the data flow; and determining whether data offloading is permitted based on the access point name.

21. The non-transitory computer-readable storage medium of claim 19, further comprising one or more instructions for:

identifying a destination address associated with the data flow;

identifying an access point name associated with the data flow;

identifying a neighbor wireless node address associated with the data flow; and determining whether data offloading is permitted based on the destination address, the access point name, and the neighbor wireless node address.

22. The non-transitory computer-readable storage medium of claim 19, further comprising one or more instructions for:

determining whether data offloading is permitted for the user based on whether the user has a subscription for data offloading, and wherein the data flow is a link layer data flow.

23. A method comprising:

receiving, by a wireless node, policies for data offloading;

identifying, by the wireless node, a user associated with a data flow to which a user device is attached;

determining, by the wireless node, whether data offloading is permitted for the user based on the policies; and performing, by the wireless node, data offloading when it is determined that data offloading is permitted for the user, wherein data offloading includes routing the data flow away from at least one of a higher layer traffic aggregation device relative to the wireless node or a higher hierarchical controlling device relative to the wireless node, wherein when the wireless node comprises an evolved node B, the method further comprises:

routing the data flow to a serving gateway when it is determined that data offloading is not permitted; and wherein when the wireless node comprises the serving gateway, the method further comprises:

routing the data flow to a packet data network gateway when it is determined that data offloading is not permitted.

* * * * *